(12) United States Patent
Reitan et al.

(10) Patent No.: US 9,904,377 B2
(45) Date of Patent: Feb. 27, 2018

(54) COMMUNICATION BETWEEN ACTIVE STYLUS AND TOUCH SENSOR

(71) Applicant: Atmel Corporation, San Jose, CA (US)

(72) Inventors: Odd Magne Reitan, Trondheim (NO); Eivind Holsen, Trondheim (NO); Lloyd Clark, Trondheim (NO)

(73) Assignee: Atmel Corporation, San Jose, CA (US)

( * ) Notice: Subject to any disclaimer, the term of this patent is extended or adjusted under 35 U.S.C. 154(b) by 184 days.

(21) Appl. No.: 14/925,748

(22) Filed: Oct. 28, 2015

(65) Prior Publication Data

US 2017/0123519 A1  May 4, 2017

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC .............................. G06F 3/03545; G06F 3/044
See application file for complete search history.

(56) References Cited

U.S. PATENT DOCUMENTS

| | | | | |
|---|---|---|---|---|
| 3,395,340 | A * | 7/1968 | Anstey | G01R 27/32 324/615 |
| 5,449,893 | A * | 9/1995 | Bridgelall | G06K 7/10851 235/462.27 |
| 7,663,607 | B2 | 2/2010 | Hotelling | |
| 7,864,503 | B2 | 1/2011 | Chang | |
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |

(Continued)

FOREIGN PATENT DOCUMENTS

WO   WO 2012/129247 A2   9/2012

OTHER PUBLICATIONS

Julian et al; "A Comparative Study of Sound Localization Algorithms for Energy Aware Sensor Network Nodes"; published at IEEE Transactions on Circuits and Systems—I: Regular Papers, vol. 51, No. 4, Apr. 2004, pp. 640-648.*

(Continued)

*Primary Examiner* — Mihir K Rayan
(74) *Attorney, Agent, or Firm* — Baker Botts L.L.P.

(57) ABSTRACT

In certain embodiments, a method includes wirelessly receiving, by an electrode of a stylus, a signal sent from a touch sensor of a computing device. The received signal includes a data bit and is based on a predefined code sequence. The method also includes producing, by the electrode of the stylus, a derivative signal from the received signal, the derivative signal corresponding to a derivative with respect to time of the received signal. The method further includes performing, by the stylus, a cross-correlation of the derivative signal and an expected-signal pattern, the expected-signal pattern based on a derivative with respect to time of the predefined code sequence, where the cross-correlation produces a cross-correlation signal including one or more cross-correlation pulses. The method also includes determining, by the stylus, based on the cross-correlation signal, that the received signal is associated with the predefined code sequence.

20 Claims, 16 Drawing Sheets

(56) References Cited

U.S. PATENT DOCUMENTS

| | | |
|---|---|---|
| 8,049,732 B2 | 11/2011 | Hotelling |
| 8,179,381 B2 | 5/2012 | Frey |
| 8,217,902 B2 | 7/2012 | Chang |
| 8,723,824 B2 | 5/2014 | Myers |
| 2003/0197691 A1* | 10/2003 | Fujiwara ............. G06F 3/03545 345/179 |
| 2004/0170197 A1* | 9/2004 | Mehta ................. H04L 27/2662 370/504 |
| 2005/0141263 A1* | 6/2005 | Umeda ................ G06K 9/0002 365/149 |
| 2008/0309635 A1 | 12/2008 | Matsuo |
| 2009/0315854 A1 | 12/2009 | Matsuo |
| 2010/0085838 A1* | 4/2010 | Altman .................. G01S 5/021 367/124 |
| 2012/0050231 A1* | 3/2012 | Westhues ............ G06F 3/03545 345/179 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0106797 A1* | 5/2013 | Pant ...................... G06F 3/0383 345/179 |
| 2013/0207938 A1* | 8/2013 | Ryshtun ............... G06F 3/0416 345/179 |
| 2015/0256329 A1* | 9/2015 | Cheong .................. G06F 3/041 375/371 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/145,894, filed Mar. 21, 2011, Rothkopf.
Meel, J., "Spread Spectrum (SS)" Spread Spectrum [online], date Oct. 1998, [retrieved on Oct. 13, 2015]. Retrieved from the Internet: <URL: http://www.sss-mag.com/pdf/Ss_jme_denayer_intro_print.pdf>.

* cited by examiner

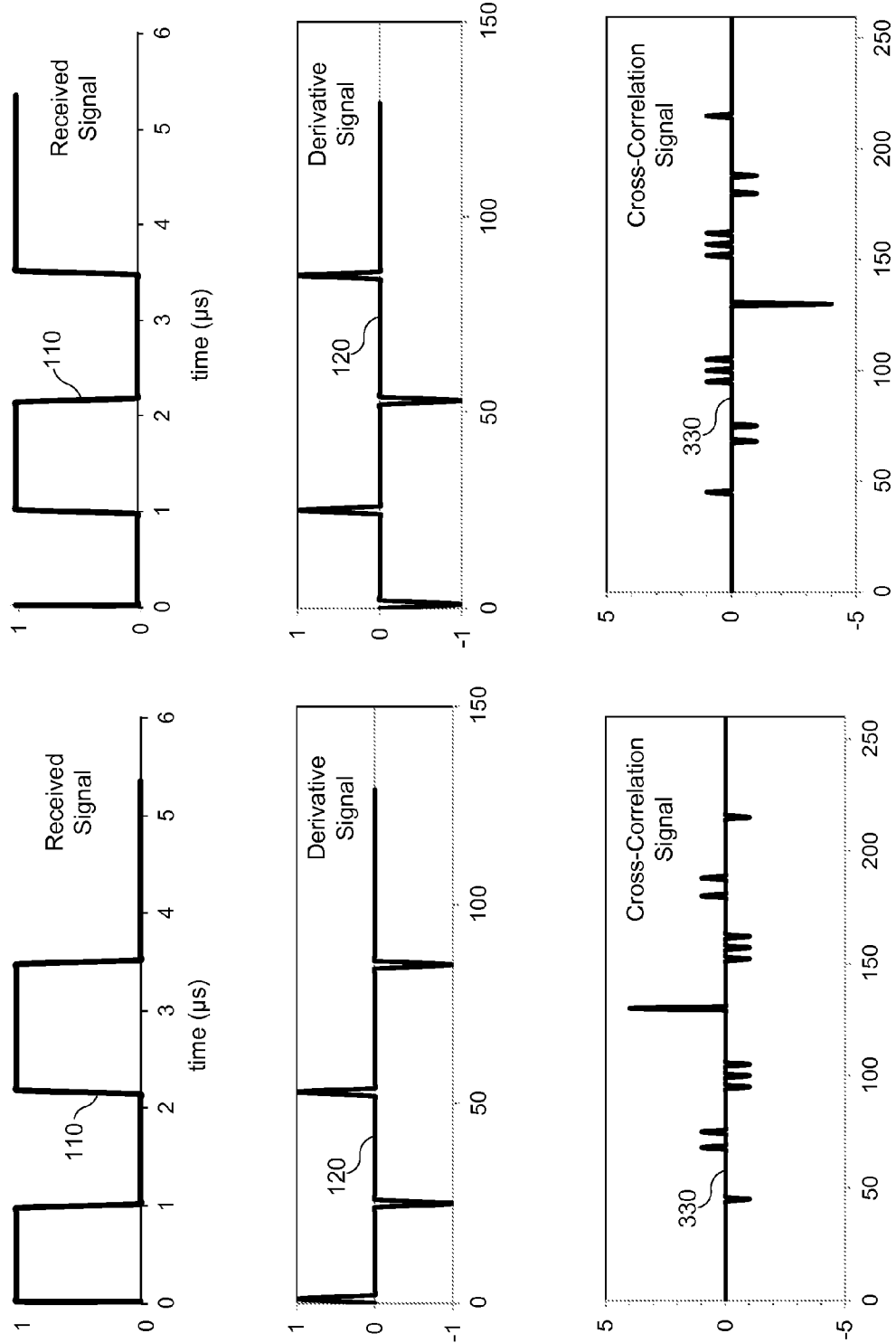

| # bits | Code Sequence 300 | Peak-to-Sidelobe Ratio |
|---|---|---|
| 3 | +1 +1 -1 | 2 |
| 4 | +1 +1 -1 +1 | 3 |
| 7 | +1 +1 +1 -1 -1 +1 -1 | 4 |
| 8 | -1 -1 -1 -1 +1 +1 -1 +1 | 3 |
| 8 | -1 +1 +1 -1 +1 +1 +1 -1 | 4 |
| 10 | +1 +1 -1 -1 +1 -1 -1 -1 -1 +1 | 4 |
| 13 | +1 +1 -1 +1 +1 -1 -1 -1 +1 +1 +1 +1 -1 | 5 |
| 14 | +1 +1 +1 +1 +1 -1 +1 +1 -1 -1 +1 +1 -1 -1 | 6 |
| 15 | -1 +1 +1 +1 +1 -1 -1 +1 +1 -1 +1 -1 +1 +1 -1 | 6 |
| 17 | +1 +1 -1 +1 +1 +1 -1 -1 +1 -1 +1 -1 -1 -1 -1 +1 -1 | 6 |
| 19 | +1 +1 +1 +1 -1 -1 +1 +1 -1 +1 -1 +1 -1 -1 +1 +1 -1 -1 +1 | 6 |
| 23 | +1 +1 +1 +1 +1 -1 -1 +1 +1 -1 +1 -1 +1 -1 -1 +1 +1 -1 -1 +1 +1 -1 -1 | 8 |
| 23 | +1 +1 +1 +1 +1 -1 -1 -1 +1 +1 -1 +1 +1 -1 +1 -1 +1 -1 -1 -1 -1 +1 -1 | 4 |
| 24 | -1 +1 +1 +1 +1 -1 -1 +1 +1 -1 +1 -1 +1 +1 -1 +1 -1 -1 -1 +1 -1 -1 -1 +1 | 8 |
| 24 | -1 +1 +1 +1 -1 -1 -1 -1 +1 +1 -1 +1 +1 -1 +1 -1 +1 -1 -1 -1 +1 -1 +1 -1 | 4 |
| 33 | +1 +1 +1 +1 +1 +1 +1 +1 -1 -1 +1 -1 -1 +1 -1 +1 +1 -1 +1 -1 -1 +1 -1 -1 -1 -1 -1 +1 +1 -1 +1 +1 -1 | 7 |
| 34 | +1 +1 -1 -1 -1 -1 -1 -1 +1 -1 -1 +1 +1 -1 +1 +1 -1 +1 -1 -1 +1 +1 -1 +1 +1 -1 -1 -1 -1 -1 -1 -1 +1 +1 | 8 |
| 36 | +1 +1 -1 -1 -1 +1 +1 +1 +1 -1 -1 +1 -1 -1 -1 -1 +1 -1 +1 -1 +1 -1 -1 -1 -1 -1 -1 +1 +1 +1 +1 +1 +1 +1 -1 -1 | 10 |
| 40 | ones(1,5) ?ones(1,7) ones(1,11) ?ones(1,17) | 4 |
| 100 | ones(1,10) ?ones(1,15) ones(1,27) ?ones(1,48) | 4 |

FIGURE 15

COMMUNICATION BETWEEN ACTIVE STYLUS AND TOUCH SENSOR

TECHNICAL FIELD

This disclosure generally relates to touch sensors and active styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIG. 13 illustrates an example received signal, an example derivative signal, and an example cross-correlation signal.

FIG. 14 illustrates an example received signal, an example derivative signal, and an example cross-correlation signal.

FIG. 15 is a table of example code sequences.

DESCRIPTION OF EXAMPLE EMBODIMENTS

Figure 1:
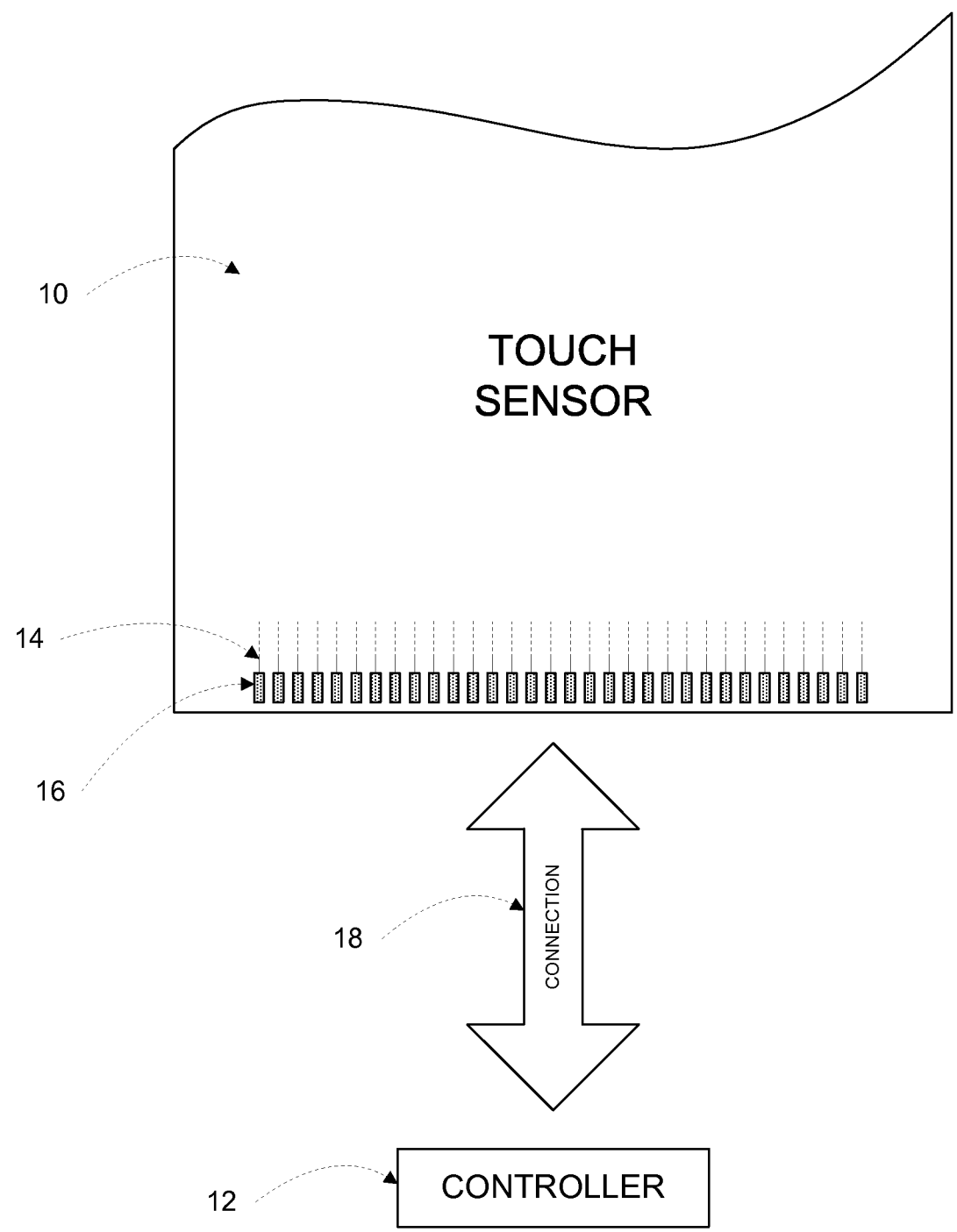
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. In particular embodiments, a touch-sensor controller may be referred to as a touch controller. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example, an electrode may be made of fine lines of metal or other conductive material (FLM), such as for example copper, silver, carbon, or a copper-, silver-, or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
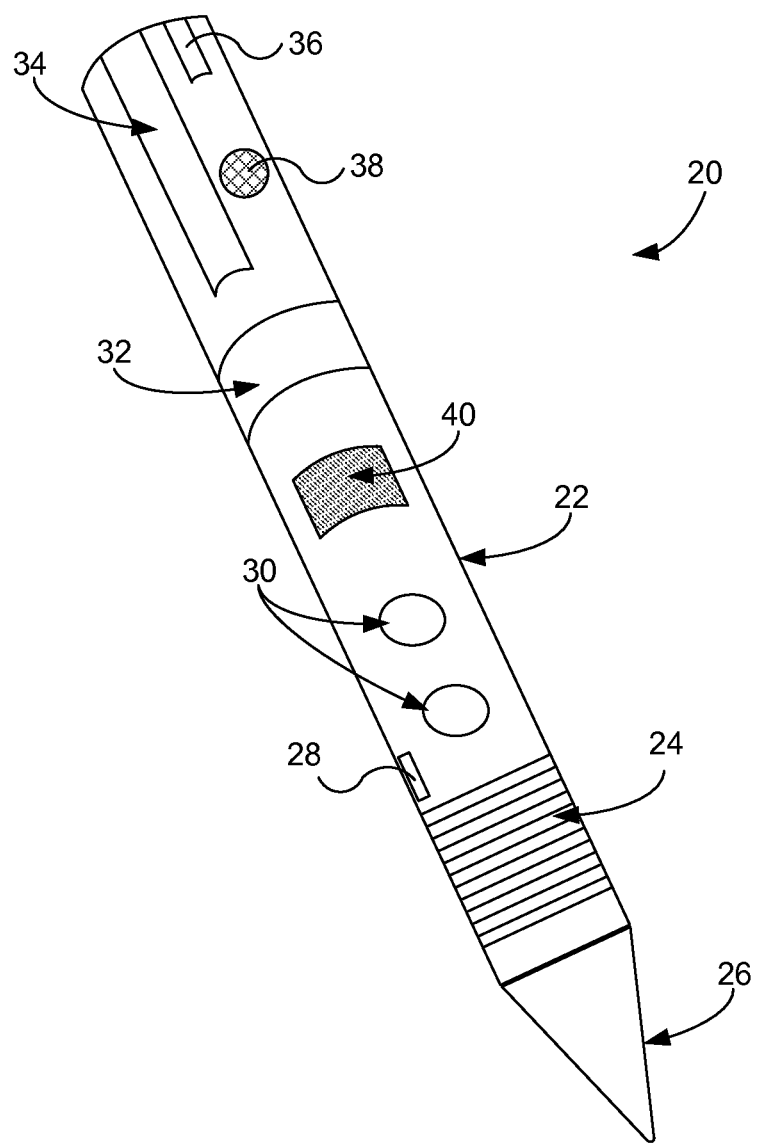
FIG. 2 illustrates an example active stylus exterior.

FIG. 2 illustrates an example exterior of an example active stylus 20, which may be used in conjunction with touch sensor 10 of FIG. 1. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example, interactions may include communication between active stylus 20 and a device, enabling or altering functionality of active stylus 20 or a device, or providing feedback to or accepting input from one or more users. The device may be any suitable device, such as, for example, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example, sliders 32 and 34 or buttons 30 may be implemented using areas of flexible mesh formed using lines of conductive material. As another example, sliders 32 and 34 or buttons 30 may be implemented using an FPC.

Active stylus 20 may have one or more components configured to provide feedback to or accept feedback from a user, such as, for example, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or an electrophoretic display. As an example, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example, dragging a finger across modified surface area 40 may initiate an interaction, such as data transfer, between active stylus 20 and a device.

One or more components of active stylus 20 may be configured to communicate a signal or data between active stylus 20 and a device. In particular embodiments, active stylus 20 may have a tip 26 located at an end of active stylus 20, and tip 26 may include one or more electrodes configured to communicate data between active stylus 20 and one or more devices or other active styluses. By way of example, the electrodes of active stylus 20 may reside on outer body 22 of active stylus, in active-stylus tip 26, or on or in any other suitable part of active stylus 20. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
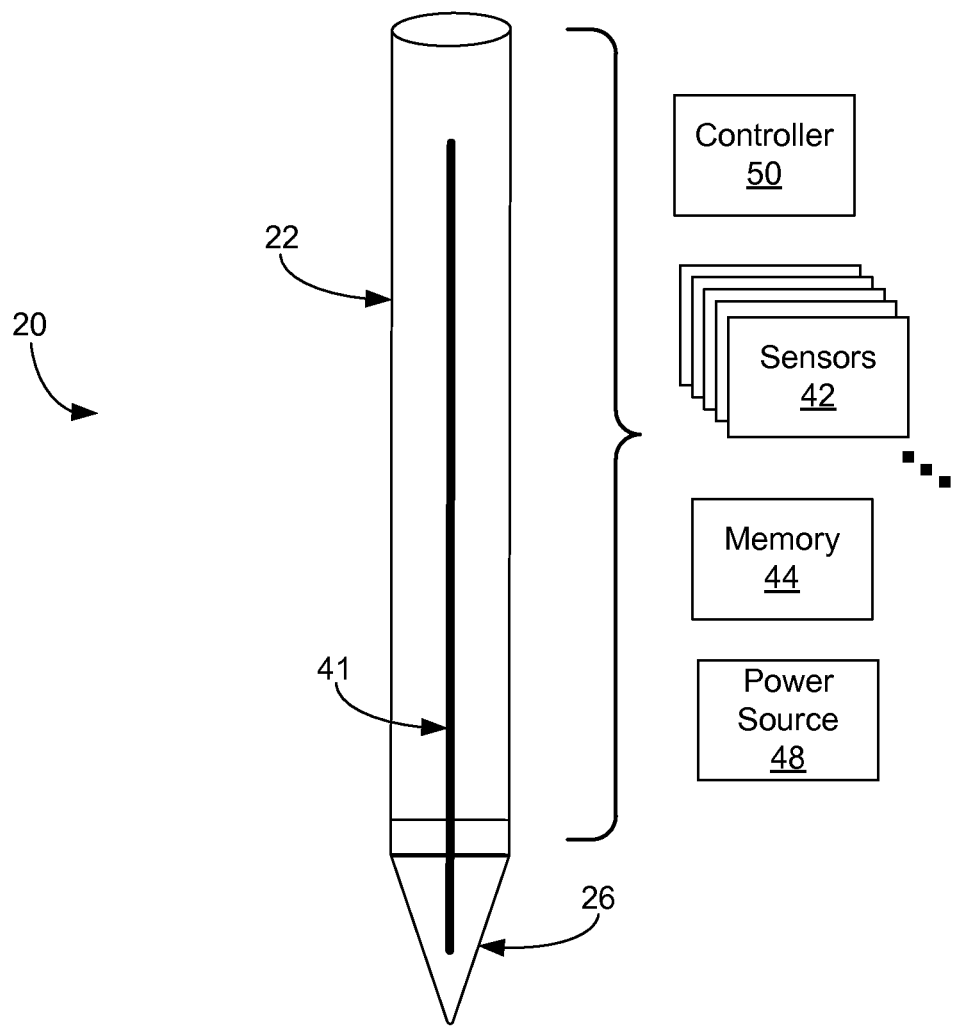
FIG. 3 illustrates an example active stylus interior.

FIG. 3 illustrates example internal components of an example active stylus 20. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example, via a radio frequency (RF) communication link. In this case, active stylus 20 includes a RF device for transmitting data over the RF link.

Controller 50 may be a microcontroller or any other type of computing device or processor suitable for controlling the operation of active stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in active stylus 20, either via drive or sense units or directly. The drive unit may supply signals to electrodes of tip 26 through center shaft 41. The drive unit may also supply signals to control or drive sensors 42 or one or more external components of active stylus 20. In particular embodiments, the drive unit of active stylus 20 may be configured to transmit a signal that may be detected by electrodes of touch sensor 10. As an example, the drive unit of active stylus 20 may include a voltage pump or a switch, such that the voltage pump may generate a high voltage signal, or the switch may toggle the potential of tip 26 between zero voltage and one or more pre-determined voltage levels. The drive unit of active stylus 20 may transmit a signal, such as a square wave, sine wave, or digital-logic signal, that may be sensed by the electrodes of touch sensor 10. In particular embodiments, the drive unit of active stylus 20 may transmit a signal to the electrodes of touch sensor 10 by applying a voltage or current to electrodes of tip 26 that results in charge removal or charge addition to the electrodes of touch sensor 10, mimicking a touch or anti-touch of a finger on a pulse-by-pulse basis.

The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example, power source 48 may be a rechargeable battery that may be charged by motion induced on active stylus 20. In other particular embodiments, power source 48 of active stylus 20 may provide power to or receive power from the device or other external power source. As an example, power may be inductively transferred between power source 48 and a power source of the device or another external power source, such as a wireless power transmitter. Power source may also be powered or recharged by a wired connection through an applicable port coupled to a suitable power source.

Figure 4:
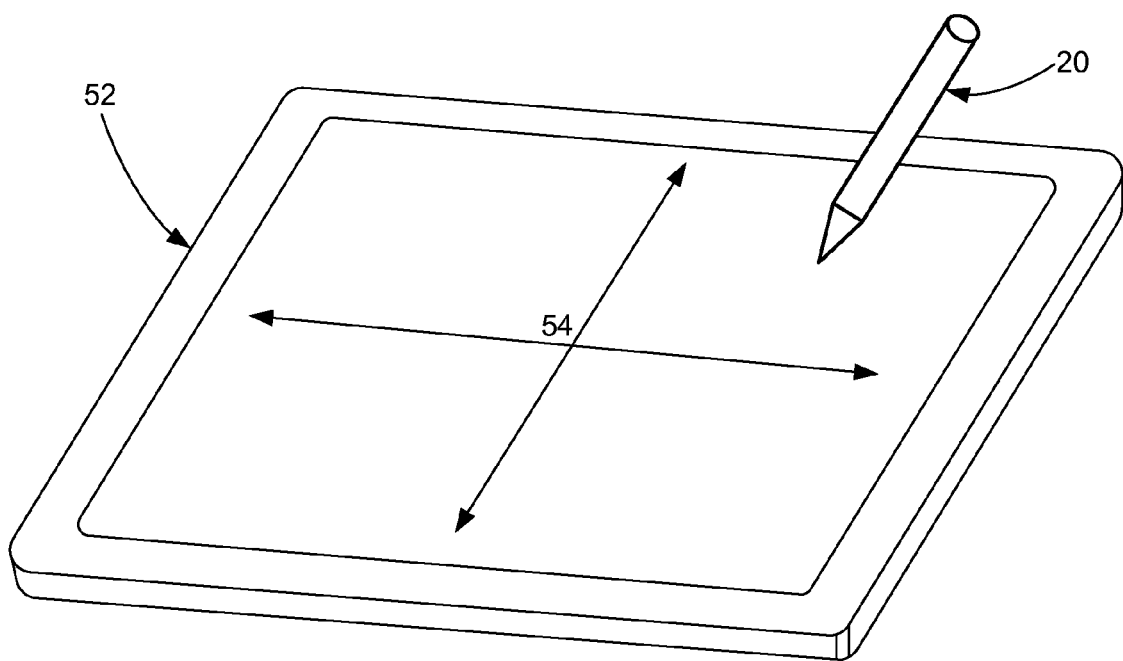
FIG. 4 illustrates an example active stylus with an example device.

FIG. 4 illustrates an example active stylus 20 with an example device 52. Device 52 may include a touch sensor similar to touch sensor 10 of FIG. 1. Device 52 may be any suitable device that includes a touch sensor, such as, for example, a desktop computer, laptop computer, tablet computer, personal digital assistant (PDA), smartphone, satellite navigation device, portable media player, portable game console, kiosk computer, point-of-sale device, or other suitable device. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example, active stylus 20 may be synchronized to device 52 through a pre-determined bit sequence transmitted by the touch sensor of device 52. As another example, active stylus 20 may be synchronized to device 52 by processing a drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example, when active stylus 20 is brought in contact with or in the proximity of touch-sensitive area 54 of device 52, signals generated by active stylus 20 may influence capacitive nodes of touch-sensitive area of device 52 or vice versa. In particular embodiments, interaction between active stylus 20 and device 52 may occur when tip 26 of active stylus 20 is in contact with or in proximity to device 52. As an example, active stylus 20 may transmit tip pressure information (e.g., an amount of pressure being applied to tip 26) to device 52. As another example, active stylus 20 may transmit a status of a button or switch (e.g., button 30 is pressed or in a closed state; or button 30 is not pressed or is in an open state) to device 52. A user may press a button 30 while active stylus 20 is in proximity of touch-sensitive area 54 of device 52, and based on the button 30 being pressed, active stylus 20 may interact with device 52 to initiate a mouse-type function, such as for example, a mouse click (e.g., a left, right, or middle mouse click) or a mouse hover. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, one or more measurement signals from sensors 42 of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, noise from device 52 display, stylus circuitry noise, or external noise. The overall noise external to active stylus 20 may have frequency characteristics covering a wide range of the spectrum, including narrow-band noise and wide-band noise, as well.

In particular embodiments, a signal may be received by one or more electrodes capable of sensing signals in active stylus 20. These electrodes may reside on or within active-stylus tip 26. The signal received by the electrodes in active stylus 20 may then be transmitted from the electrodes to controller 50. In particular embodiments, a signal may be transmitted to controller 50 via center shaft 41. Controller 50, as discussed above, may include, without limitation, a drive unit, a sense unit, a storage unit, and a processor unit. In particular embodiments, a received signal may be amplified by any suitable amplifier. In particular embodiments, a received signal may be filtered by any suitable filter, including a high-pass, low-pass, or band-pass digital or analog filter. In particular embodiments, device 52 may transmit data to active stylus 20 by sending data to one or more drive electrodes of touch sensor 10, and active stylus 20 may receive data via electrodes of tip 26. In particular embodiments, active stylus 20 may transmit data to device 52 by performing charge addition or charge removal on one or more sense electrodes of touch sensor 10, and device 52 may receive data sent from active stylus 20 by sensing data with one or more sense electrodes of touch sensor 10. In particular embodiments, a signal from device 52 to active stylus 20 (or vice versa) may be transmitted asynchronously. As an example, active stylus 20 may transmit data to device 52 without first sending a synchronization signal. In particular embodiments, a signal from device 52 to active stylus 20 (or vice versa) may be transmitted synchronously. As an example, prior to sending data to device 52, active stylus 20 may first send a synchronization signal that includes a clock-recovery portion or a symbol-timing recovery portion. In particular embodiments, signals sent between devices may include any suitable communication method or protocol or any suitable combination of communication methods or protocols. As an example, active stylus 20 may transmit data to device 52 asynchronously using a cross-correlation communication method as described herein. As another example, device 52 may transmit a synchronization signal based on a cross-correlation communication method as described herein, and then after stylus 20 is synchronized to device 52, device 52 may transmit data using another communication method (e.g., amplitude-shift keying, phase-shift keying, or frequency-shift keying). Although this disclosure describes and illustrates particular devices configured to transmit or receive particular information using particular communication methods, this disclosure contemplates any suitable devices configured to transmit or receive any suitable information using any suitable communication methods.

Figure 5:
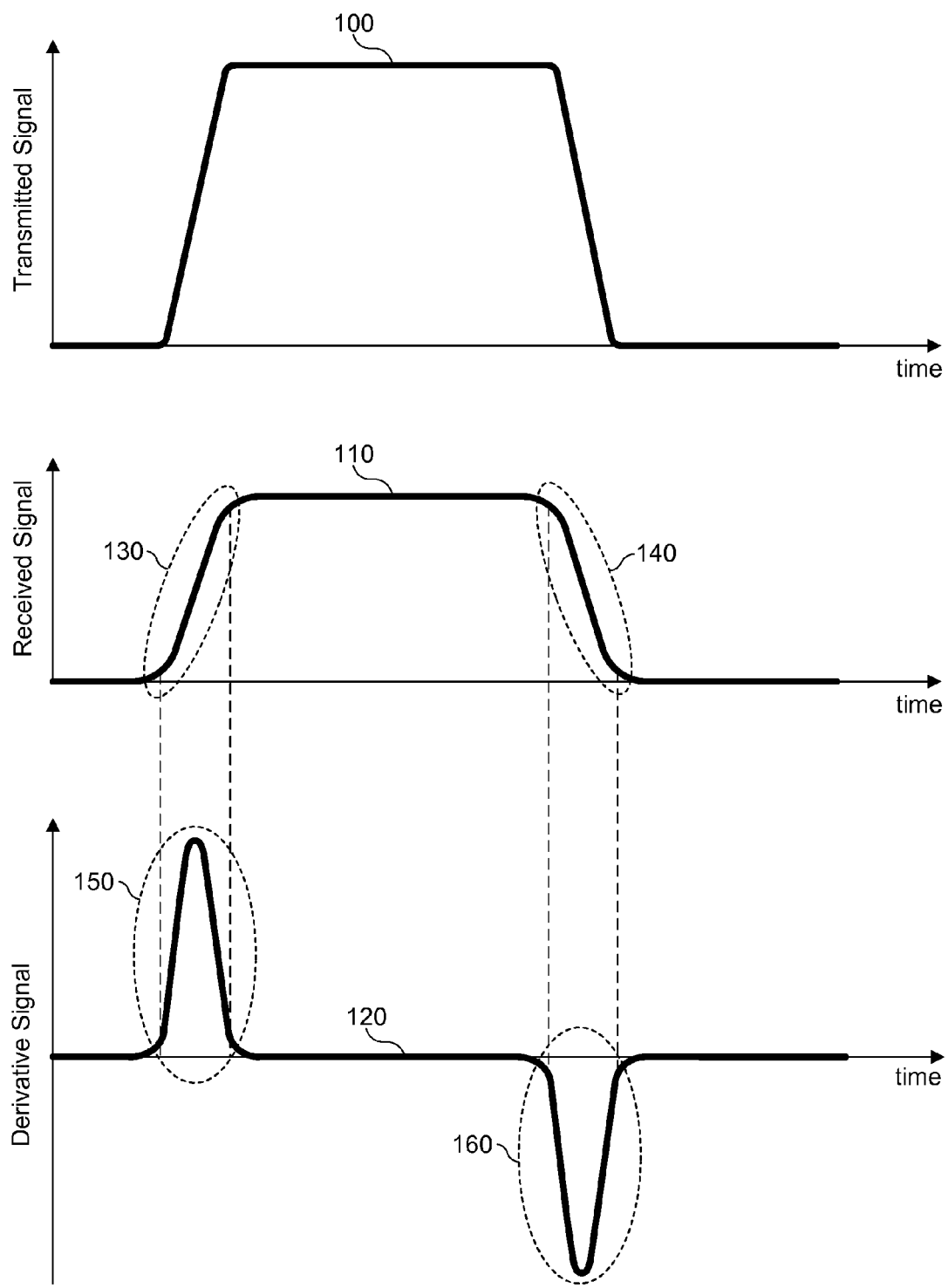
FIG. 5 illustrates an example transmitted signal, an example received signal, and an example derivative signal.

FIG. 5 illustrates example transmitted signal 100, example received signal 110, and example derivative signal 120. In particular embodiments, transmitted signal 100 may be sent by a first device (the transmitting device) and wirelessly received, as received signal 110, by a second device (the receiving device). For example, the transmitting device may be a computing device (e.g., device 52) with a touch sensor 10, and transmitted signal 100 may be transmitted using one or more electrodes of touch sensor 10. The receiving device may be a stylus (e.g., active stylus 20), and transmitted signal 100 may be received (in the form of received signal 110) by one or more electrodes located on or in tip 26 or another suitable portion of active stylus 20. As another example, the transmitting device may be a stylus (e.g., active stylus 20), and the receiving device may be a computing device (e.g., device 52) with a touch sensor 10. The active stylus 20 may include one or more electrodes which send transmitted signal 100, and the computing device may receive the signal (as received signal 110) through one or more electrodes of touch sensor 10. In particular embodiments, communication between a first and second device may be a one-way communication or a two-way communication. As an example, an active stylus 20 may perform one-way communication where active stylus 20 is configured as a transmit-only stylus which sends information to device 52 and does not receive information from device 52. As another example, an active stylus 20 and a device 52 may perform two-way communication where each device sends information to the other device.

In particular embodiments, transmitted signal 100 may be transmitted using one or more electrodes of a first device and may be received as received signal 110 by one or more electrodes of a second device. As an example, the electrodes of the first or second device may be electrodes of a touch sensor 10 or may be dedicated electrodes for wirelessly transmitting or receiving signals. In particular embodiments, a first and second device may be configured for two-way communication such that the each device is configured to send and receive signals. For example, a touch sensor 10 of a computing device (e.g., device 52) may send transmitted signal 100 to a stylus (e.g., active stylus 20) and may receive another transmitted signal 100, as received signal 110, from the stylus (e.g., active stylus 20). In particular embodiments, a transmitting device or a receiving device may be an active stylus, desktop computer, laptop computer, touch-sensitive display, tablet computer, smartphone, or any other suitable device. For example, the transmitting device may be a smartphone, and the receiving device may be a stylus positioned in proximity of the smartphone. As another example, the transmitting and receiving devices may both be styluses which may use one or more electrodes to transmit or receive signals between each other. Although this disclosure describes and illustrates particular devices configured to wirelessly transmit or receive particular signals, this disclosure contemplates any suitable devices configured to wirelessly transmit or receive any suitable signals.

In particular embodiments, transmitted signal 100 may be wirelessly transmitted via a capacitive coupling between the electrodes of two devices. As an example, transmitted signal 100 may correspond to a voltage signal applied to one or more transmit electrodes of touch sensor 10, and transmitted signal 100 may be wirelessly transmitted across a gap (e.g., a gap that includes air, dielectric material, or a combination of air and dielectric material) between a transmit electrode and a receive electrode. Similarly, received signal 110 may correspond to a voltage signal received by one or more receive electrodes through a capacitive coupling with a transmit electrode. In particular embodiments, received signal 110 and transmitted signal 100 may have similar characteristics (e.g., shape and timing) as well as some differences in signal amplitude, rise time, or fall time.

As illustrated in FIG. 5, in certain embodiments, received signal 110 and transmitted signal 100 have a similar shape as well as similar timing of their respective rising and falling edges. In FIG. 5, transmitted signal 100 has a larger amplitude than received signal 110, which may be associated with an attenuation of transmitted signal 100 propagating between a transmit electrode and a receive electrode. Additionally, the rise- and fall-times of received signal 110 are slower than the corresponding rise- and fall-times of transmitted signal, which may be associated with a receive electrode having a slower response time than a transmit electrode. In particular embodiments, received signal 110 and transmitted signal 100 may share an overall correspondence in terms of shape or timing, while specific characteristics (e.g., amplitude, rise time, or fall time) of each signal may depend on one or more electrical properties of a transmit electrode, a receive electrode, or a gap between the electrodes. Although this disclosure describes and illustrates particular transmitted and received signals having particular characteristics, this disclosure contemplates any suitable transmitted and received signals having any suitable characteristics.

In particular embodiments, received signal 110 may include a series of rising edges 130 and falling edges 140. For example, transmitted signal 100 and received signal 110 may correspond to a two-level digital signal having multiple rising edges 130 and falling edges 140. FIG. 5 illustrates a received signal 110 having a single rising edge 130 and a single falling edge 140. In particular embodiments, transmitted signal 100 and received signal 110 may each include 1, 2, 3, 5, 10, 20, 50, or any suitable number of rising and falling edges. Although this disclosure describes and illustrates particular signals having particular numbers of rising and falling edges, this disclosure contemplates any suitable signals having any suitable numbers of rising and falling edges.

In particular embodiments, one or more electrodes may produce a derivative signal from a received signal, where the derivative signal is derived from the received signal and corresponds to a derivative with respect to time of the received signal. For example, an electrode of an active stylus may produce a derivative signal D(t) from a received signal R(t), where D(t)=k dR(t)/dt, and k is a constant. In particular embodiments, derivative signal 120 may include a series of electrical pulses, each pulse having a positive polarity (e.g., pulse 150) or a negative polarity (e.g., pulse 160). For example, derivative signal 120 may include a series of positive and negative voltage, current, charge, or electric-field pulses. In FIG. 5, positive pulse 150 may correspond to a positive pulse of charge or current, and negative pulse 160 may correspond to a negative pulse of charge or current. In particular embodiments, each positive-polarity pulse 150 may correspond to a rising edge 130 of received signal 110, and each negative-polarity pulse 160 may correspond to a falling edge 140 of received signal 110.

In FIG. 5, derivative signal 120 is a derivative with respect to time of received signal 110. Rising edge 130 of received signal 110 corresponds to positive pulse 150 of derivative signal 120, and falling edge 140 corresponds to negative pulse 160. In other particular embodiments, each positive-polarity pulse 150 may correspond to a falling edge 140 of received signal 110, and each negative-polarity pulse 160 may correspond to a rising edge 130 of received signal 110. In particular embodiments, received signal 110 may be a voltage or electric-field signal, and derivative signal 120 may represent electric charge or electric current produced based on one or more capacitances associated with one or more respective electrodes of a receiving device. For example, a capacitance C may be associated with a receive electrode of stylus 20 (or an electrode of touch sensor 10) or may be associated with a capacitive coupling between transmit and receive electrodes. The capacitance may produce derivative signal 120 based on received signal 110. Received signal 110 may be a voltage signal V(t), and derivative signal 120 may be a current signal I(t). The relationship between received signal 110 (V(t)) and derivative signal 120 (I(t)) may be expressed as $$I(t) = C\frac{dV(t)}{dt}.$$

Based on this expression, a rising or falling edge of received signal 110 (V(t)) corresponds to a positive or negative pulse, respectively, of derivative signal 120 (I(t)).

Figure 6:
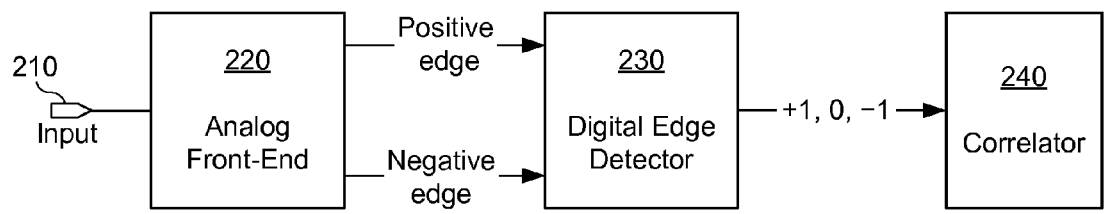
FIG. 6 illustrates an example block diagram of circuits for processing a derivative signal.

FIG. 6 illustrates example block diagram 200 of circuits for processing derivative signal 120. In particular embodiments, input 210 may be coupled to one or more electrodes which receive signal 110 and supply derivative signal 120 to input 210. In particular embodiments, derivative signal 120 may be processed or transformed by one or more analog or digital circuits to convert derivative signal 120 into a processed analog or digital signal. The processed analog or digital signal may then be supplied to a processor or controller 50 for analysis. For example, a digital signal based on derivative signal 120 may be supplied to a processor to determine whether received signal 110 includes data, and if so, to extract the data from the digital signal. As illustrated in FIG. 6, analog front-end 220 processes derivative signal 120 to produce a "positive edge" output and a "negative edge" output which are supplied to digital edge detector 230. Digital edge detector 230 provides a digital output signal based on the positive-edge and negative-edge signals, and the output of digital edge detector 230 is coupled to correlator 240 which performs a cross-correlation operation. Although this disclosure describes and illustrates particular analog and digital circuits configured to process particular signals in particular manners, this disclosure contemplates any suitable analog and digital circuits configured to process any suitable signals in any suitable manners.

Figure 7:
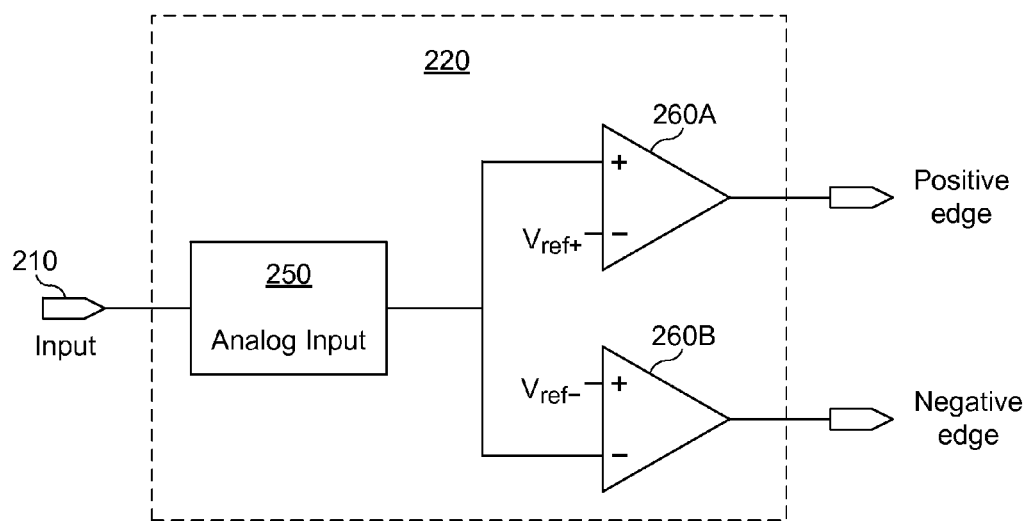
FIG. 7 illustrates an example analog front-end.

FIG. 7 illustrates example analog front-end 220. In particular embodiments, analog front-end 220 may act as an edge detector or level detector and may include an analog input circuit (analog input 250) followed by level comparators 260A and 260B. In particular embodiments, analog input 250 may include one or more input-buffer stages, amplifier stages, or filter stages (e.g., a high-pass, low-pass, or band-pass filter). As an example, analog input 250 may include an operational amplifier (op-amp) configured to amplify and apply a band-pass filter to an input derivative signal 120. In FIG. 7, positive comparator 260A is configured to produce an output of $V_{ref+}$ at the positive-edge terminal when a positive pulse or edge is applied at input 210. Similarly, negative comparator 260B is configured to produce an output of $V_{ref-}$ at the negative-edge terminal when a negative pulse or edge is supplied at input 210. In particular embodiments, the comparator reference voltages $V_{ref+}$ and $V_{ref-}$ may each be set to any suitable voltage value, such as for example, ±1.0 V, ±1.67 V, or ±2.5 V. For example, $V_{ref+}$ may be set to +1.67 V, and $V_{ref-}$ may be set to −1.67 V. The initial values of the positive-edge and negative-edge outputs may be approximately 0.0 V or ground. When derivative signal 120 has a positive pulse 150 which is applied to input 210, the positive-edge output will go to +1.67 V, and the negative-edge output will remain at 0.0 V. Similarly, when derivative signal 120 has a negative pulse 160 which is applied to input 210, the negative-edge output will go to −1.67 V, and the positive-edge output will remain at 0.0 V. Although this disclosure describes and illustrates particular analog front-ends which include particular components and particular comparator reference voltages, this disclosure contemplates any suitable analog front-ends which include any suitable components and any suitable comparator reference voltages.

Figure 8:
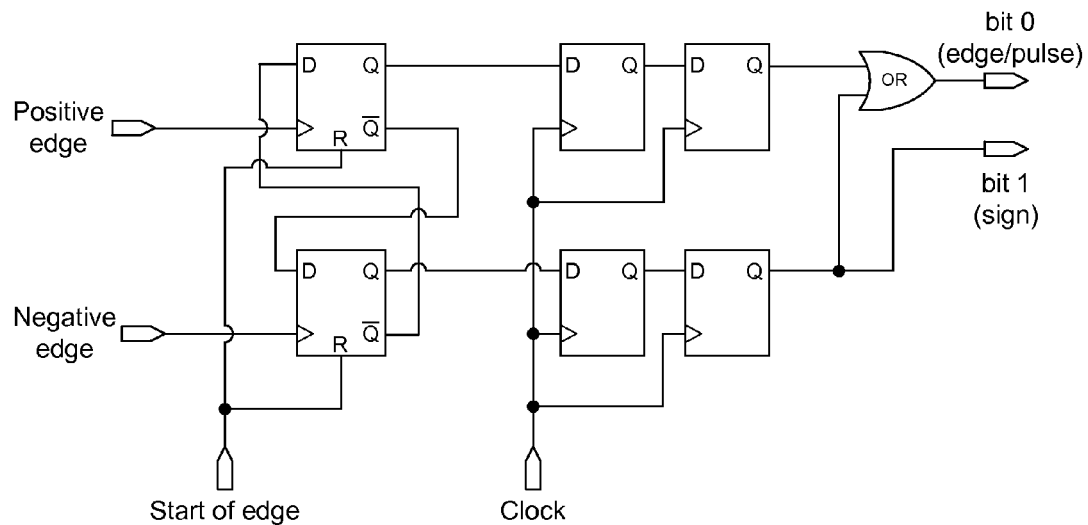
FIG. 8 illustrates an example digital edge detector.
Figure 9:
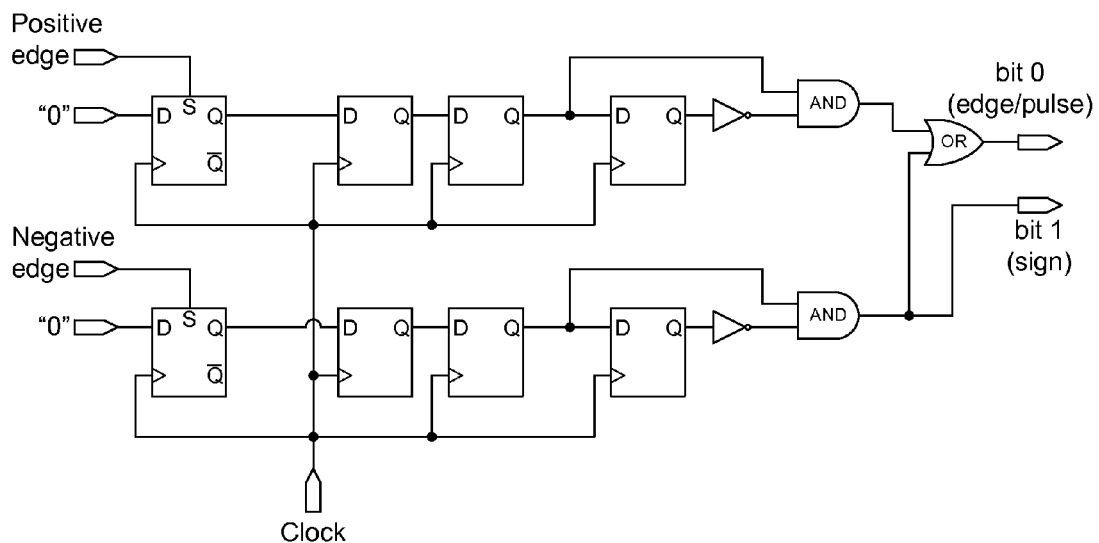
FIG. 9 illustrates another example digital edge detector.

FIG. 8 illustrates an example digital edge detector 230, and FIG. 9 illustrates another example digital edge detector 230. In particular embodiments, digital edge detector 230 may receive positive-edge and negative-edge input signals and produce a digital output signal based on the input signals. In particular embodiments, digital edge detector 230 may include a series of flip-flop circuits which produce a digital output signal. Digital edge detector 230 may detect a change in the positive-edge or negative-edge input and may maintain the detected edge until the circuitry is cleared or reset. In FIGS. 8 and 9, the digital output signal is represented by the values of outputs "bit 0" and "bit 1." The "bit 0" output indicates the presence of an edge (which corresponds to the presence of a pulse in derivative signal 120) in either the positive-edge input or the negative-edge input, and the "bit 1" output indicates whether the edge is a positive or negative edge. For example, if the values of (bit 0, bit 1) are (1,0), this indicates the presence of a positive edge, which corresponds to a positive pulse in derivative signal 120. If the values of (bit 0, bit 1) are (1,1), this indicates the presence of a negative edge, which corresponds to a negative pulse in derivative signal 120.

In particular embodiments, derivative signal 120 may be converted into a digital output signal such that each positive-polarity pulse 150 is converted into a first value of the digital output signal and each negative-polarity pulse 160 is converted into a second value of the digital signal. The output bits (bit 0, bit 1) may be represented as follows: (1,0) corresponds to a value of +1 (which indicates the presence of positive pulse 150 in derivative signal 120); (1,1) corresponds to a value of −1 (which indicates the presence of negative pulse 160); and (0,0) corresponds to a value of 0 (which indicates no pulse present). As an example, the digital output signal may be referred to as having a value of +1 when a positive pulse 150 in derivative signal 120 occurs. Additionally, the digital signal may be referred to as having a value of −1 when a negative pulse 160 occurs, and the digital signal may be referred to as having a value of 0 when no pulse is present. In particular embodiments, the digital output signal may include a series of values +1, 0, or −1, which correspond respectively to a positive pulse 150, no pulse, and a negative pulse 160 in derivative signal 120. Although this disclosure describes and illustrates particular digital edge detectors which include particular components, this disclosure contemplates any suitable digital edge detectors which include any suitable components.

Figure 10:
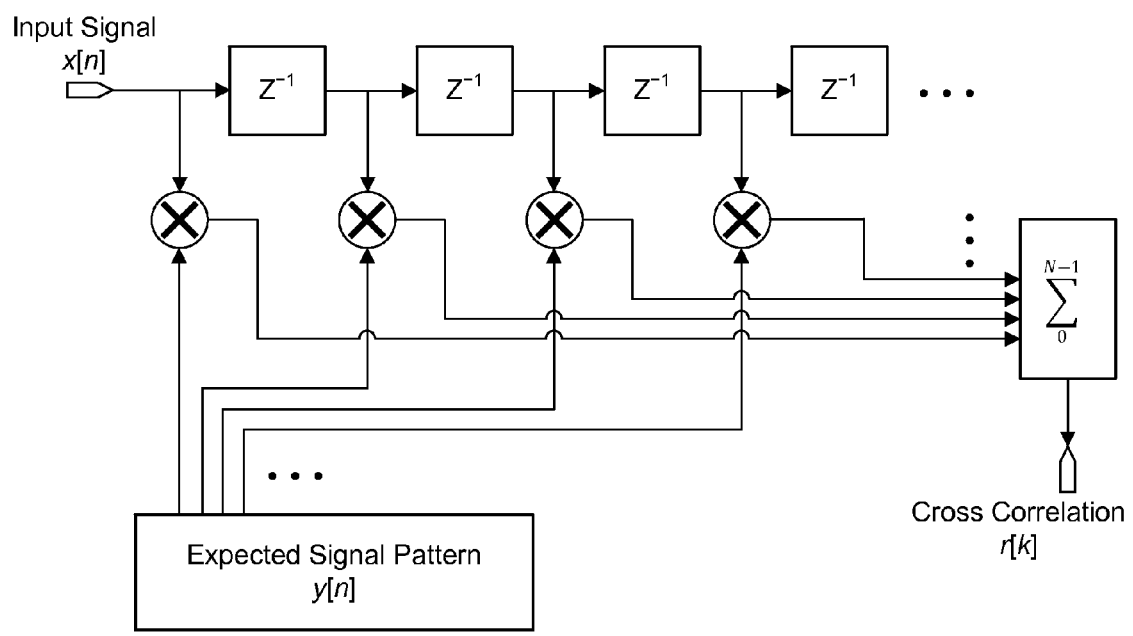
FIG. 10 illustrates an example correlator circuit.

FIG. 10 illustrates example correlator circuit 240. In particular embodiments, correlator circuit 240 may perform a cross-correlation between derivative signal 120 and an expected signal pattern. In particular embodiments, the expected-signal pattern may be based on a derivative with respect to time of a predefined code sequence, which is described below. In particular embodiments, prior to performing a cross-correlation operation, derivative signal 120 may be converted into a digital signal (e.g., as described above), and performing a cross-correlation may include performing a cross-correlation of digital signal x[n] and an expected-signal pattern y[n] to produce a cross-correlation signal r[k]. The cross-correlation between x[n] and y[n] may be expressed as $r_{xy}[k]=\Sigma_{n=0}^{N-1}x[n+k]\times y[n]$. In FIG. 10, correlator circuit 240 performs a cross-correlation between input digital signal x[n] and expected-signal pattern y[n]. The delay of the digital signal x[n] with respect to the expected-signal pattern y[n] is achieved with a tapped delay line where each $Z^{-1}$ block represents a time delay of one symbol period. As described above, the digital signal x[n] may have a series of values (+1, 0, or −1), which correspond respectively to a positive pulse, no pulse, and a negative pulse in derivative signal 120. For example, the digital signal x[n] may be expressed as (+1,0,−1,0,+1,0,0,−1,0). In particular embodiments, the cross-correlation signal r[k] may to supplied to a processor or controller 50 for analysis. Although this disclosure describes and illustrates particular correlator circuits which include particular components, this disclosure contemplates any suitable correlator circuits which include any suitable components.

Figure 11:
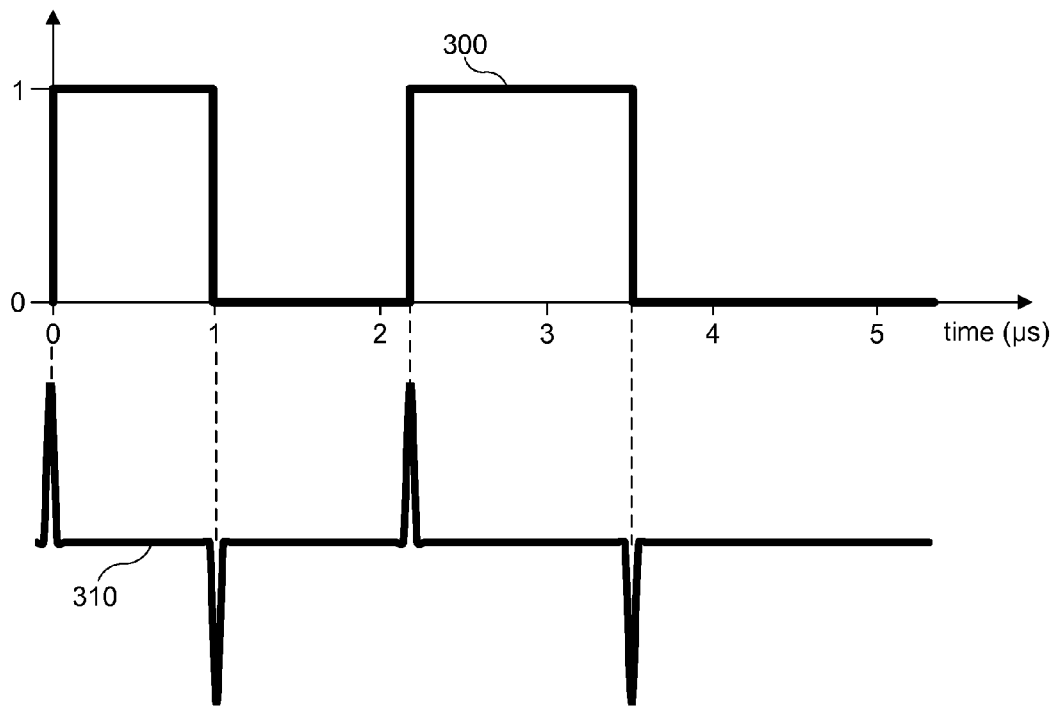
FIG. 11 illustrates an example predefined code sequence and an example expected-signal pattern.

FIG. 11 illustrates example predefined code sequence 300 and example expected-signal pattern 310. In particular embodiments, predefined code sequence 300 may be referred to as a code sequence or a code. In particular embodiments, code sequence 300 may be a two-level digital signal that includes a series of rising and falling edges. In FIG. 11, code sequence 300 includes two rising edges and two falling edges and has a total duration of approximately 5.3 μs. In particular embodiments, code sequence 300 may be expressed in terms of a series of values, +1 and −1, where +1 represents a digital "1" or a digital high, and −1 represents a digital "0" or a digital low. For example, code sequence 300 may be expressed as (+1 −1 +1 −1 −1) or (1 0 1 0 0). Although this disclosure describes and illustrates particular code sequences having particular durations and particular numbers of rising and falling edges, this disclosure contemplates any suitable code sequences having any suitable durations and any suitable numbers of rising and falling edges.

In particular embodiments, expected-signal pattern 310 may be based on a derivative with respect to time of predefined code sequence 300. As an example, a continuous time signal pattern may be represented by a discrete time sequence c[n], where the values of c[n] are obtained by sampling the continuous time signal pattern at regular intervals. The derivative of the continuous time signal pattern may then be approximated by the difference between successive elements of the discrete time sequence. As an example, if code sequence 300 is represented by the discrete time sequence c[n], then expected-signal pattern y[n] may be determined from the expression y[n]=c[n]−c[n−1]. In FIG. 11, expected-signal pattern 310 is the first derivative of code sequence 300. Accordingly, each rising edge of code sequence 300 is associated with a positive pulse of expected-signal pattern 310, and each falling edge of code sequence 300 is associated with a negative pulse of expected-signal pattern 310. In FIG. 11, expected-signal pattern 310 has a duration of approximately 5.3 μs and includes two positive pulses and two negative pulses. Although this disclosure describes and illustrates particular expected-signal patterns having particular durations and particular numbers of positive and negative pulses, this disclosure contemplates any suitable expected-signal patterns having any suitable durations and any suitable numbers of positive and negative pulses.

In particular embodiments, code sequence 300 may be a spread-spectrum code sequence. For example, code sequence 300 may be spread in the frequency domain which may result in a signal with improved immunity to electrical noise. In particular embodiments, a spread-spectrum code sequence may include a combination of two or more frequency components in a range of approximately 100 kHz to 1 MHz. Code sequence 300 illustrated in FIG. 11 is a spread-spectrum code sequence which results from a combination of four different frequencies: 490 kHz (corresponding to the first "1" of code sequence 300), 430 kHz (corresponding to the first "0"), 370 kHz (corresponding to the second "1), and 270 kHz (corresponding to the second "0"). Although this disclosure describes and illustrates particular spread-spectrum code sequences having particular frequency components, this disclosure contemplates any suitable spread-spectrum code sequences having any suitable frequency components.

Figure 12:
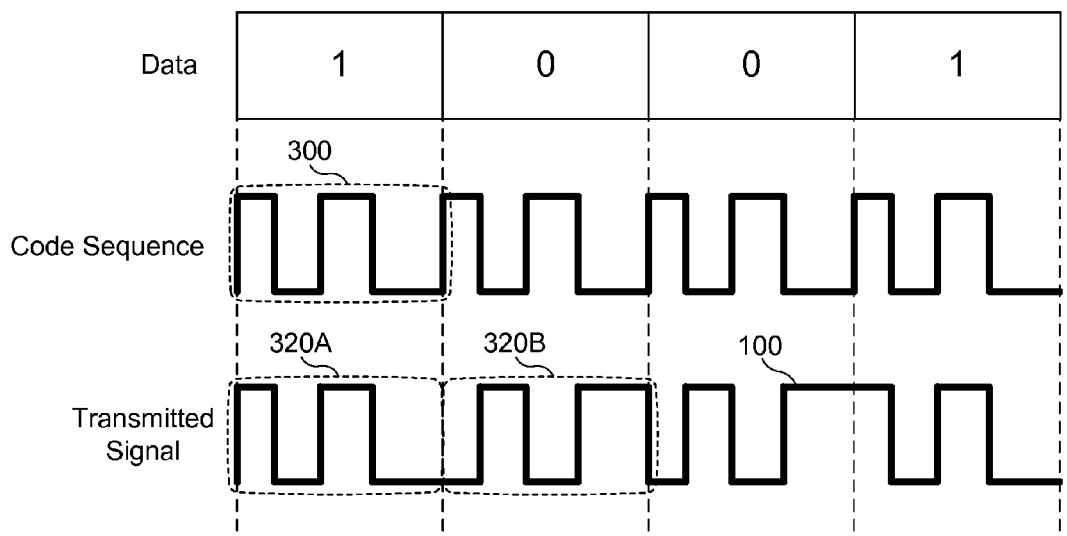
FIG. 12 illustrates an example data sequence combined with an example code sequence to produce an example transmitted signal.

FIG. 12 illustrates an example data sequence combined with example code sequence 300 to produce example transmitted signal 100. In particular embodiments, a data sequence may be any suitable series of data bits (e.g., ones and zeros in series), and code sequence 300 may be used to encode the data prior to transmission. In FIG. 12, the data sequence is "1 0 0 1," and code sequence 300 is the code sequence from FIG. 11. A data sequence may include a message or information that is sent from a transmitting device (e.g., device 52) to a receiving device (e.g., stylus 20). The transmitting device may combine the data sequence with code sequence 300 to form transmitted signal 100. The receiving device may receive the transmitted signal as received signal 110, and the receiving device may process the received signal to determine the original data sequence.

In particular embodiments, transmitted signal 100 or received signal 110 may be based on code sequence 300. For example, transmitted signal 100 may include one or more repetitions of code sequence 300, and received signal 110, which corresponds to transmitted signal 100, may also include one or more corresponding repetitions of code sequence 300. Additionally, transmitted signal 100 and received signal 110 may include one or more repetitions of an inverse of code sequence 300. An inverse of code sequence 300 may correspond to a flipped or inverted version of code sequence 300 and may be obtained by sending code sequence 300 through an inverter logic gate. In particular embodiments, transmitted signal 100 and received signal 110 may be made up of a particular pattern that includes code sequence 300 and the inverse of code sequence 300. For example, a data bit of 1 may be encoded in transmitted signal 100 as one or more repetitions of code sequence 300, and a data bit of 0 may be encoded as one or more repetitions of the inverse of code sequence 300. In FIG. 12, portion 320A of transmitted signal 100 includes one repetition of code sequence 300 which represents a bit value of 1. Portion 320B includes one repetition of the inverse of code sequence 300 which represents a bit value of 0.

In particular embodiments, transmitted signal 100 may be formed by combining a data sequence with code sequence 300. In particular embodiments, code sequence 300 may be repeated so that each data bit of a data sequence is matched up with one or more repetitions of code sequence 300, and transmitted signal 100 may be formed by combining the data sequence with multiple repetitions of code sequence 300. In FIG. 12, each data bit is matched up with one repetition of code sequence 300. In particular embodiments, transmitted signal 100 may be formed by performing a logic operation involving a data sequence and code sequence 300. For example, a transmitting device may combine a data sequence and code sequence 300 using an XOR or XNOR logic operation to form transmitted signal 100. Although this disclosure describes and illustrates particular transmitted signals based on particular data sequences combined with particular code sequences, this disclosure contemplates any suitable transmitted signals based on any suitable data sequences combined with any suitable code sequences.

FIG. 13 illustrates an example received signal 110, an example derivative signal 120, and an example cross-correlation signal 330. In FIG. 13, received signal 110 corresponds to portion 320A of transmitted signal 100 in FIG. 12. FIG. 14 illustrates an example received signal 110, an example derivative signal 120, and an example cross-correlation signal 330. In FIG. 14, received signal 110 corresponds to portion 320B of transmitted signal 100 in FIG. 12. Derivative signal 120 is a derivative with respect to time of received signal 110. As described above, an electrode of a receiving device may produce derivative signal 120 from received signal 110 such that a rising or falling edge of received signal 110 corresponds to a positive or negative pulse, respectively, of derivative signal 120. In FIGS. 13 and 14, the x-axis of the graph of derivative signal 120 may have units of clock-cycle counts, corresponding to a clock of a computing device. For example, stylus 20 or device 52 may have a processor that includes or is coupled to a clock (e.g., an RC oscillator or a crystal oscillator), such as for example a clock with a clock frequency or a sampling rate of 12 MHz, 13.6 MHz, 24 MHz, 30 MHz, or any suitable clock frequency. For the graph of derivative signal 120 in FIGS. 13 and 14, a receiving device may have a 24-MHz sampling rate, which, for a sampling duration of 5.3 μs, corresponds to approximately 127 samples.

In particular embodiments, a receiving device (e.g., stylus 20 or device 52) may perform a cross-correlation between derivative signal 120 and an expected signal pattern to produce cross-correlation signal 330. In particular embodiments, prior to performing a cross-correlation, derivative signal 120 may be converted into a digital signal (e.g., a digitized version of derivative signal 120), as discussed above, and the cross-correlation may then be performed between the digital signal and an expected signal pattern. For example, a receiving device may have expected-signal pattern 310 stored in a memory (e.g., memory 44), and a cross-correlation may be performed by a correlator circuit or by a processor or controller 50 of the receiving device. In FIGS. 13 and 14, cross-correlation signal 330 is obtained from a cross-correlation between derivative signal 120 and expected-signal pattern 310 of FIG. 11. In particular embodiments, a cross-correlation of derivative signal 120 and expected-signal pattern 310 may produce cross-correlation signal 330 which may include one or more cross-correlation pulses (also referred to as cross-correlation peaks). The cross-correlation signals of FIGS. 13 and 14 each include a total of 13 cross-correlation pulses, where the main cross-correlation pulse has a magnitude of 4 and the other 12 secondary pulses each have a magnitude of 1. Although this disclosure describes and illustrates particular cross-correlation signals having particular numbers of pulses with particular magnitudes, this disclosure contemplates any suitable cross-correlation signals having any suitable numbers of pulses with any suitable magnitudes.

In particular embodiments, an autocorrelation of expected-signal pattern 310 may have a single positive peak that is greater than a particular positive-threshold value. For example, cross-correlation signal 330 of FIG. 13 is similar to an autocorrelation of expected-signal pattern 310 of FIG. 11, and its main peak has an amplitude of +4. With a positive-threshold value set to +3, cross-correlation signal 330 of FIG. 13 may be referred to as having a single positive peak that is greater than +3. A processor configured to analyze cross-correlation signal 330 of FIG. 13 may determine that it has a single positive peak that is greater than the threshold value, and the remaining 12 secondary peaks with amplitudes of +1 or −1 (which may be referred to as sidelobes) may be discarded or removed from consideration since they are each less than the threshold value of +3. In particular embodiments, a threshold value associated with detection of peaks in cross-correlation signals 330 may be set to 50%, 60%, 75% of the main peak amplitude, or any suitable percentage of the main peak amplitude. For example, the threshold value for cross-correlation signal 330 in FIG. 13 may be set to 60% (e.g., +2.4), 80% (e.g., +3.2), or any suitable percentage of the main peak amplitude +4. In particular embodiments, a predefined code sequence 300 or an expected-signal pattern 310 may be selected based on a requirement that an autocorrelation of expected-signal pattern 310 have a single positive peak that is above a particular threshold value. For example, an expected-signal pattern 310 may not be selected if its associated autocorrelation has two main positive peaks with approximately the same amplitude.

In particular embodiments, a cross-correlation of expected-signal pattern 310 and an inverse of expected-signal pattern 310 may have a single negative peak that is less than a particular negative-threshold value. For example, cross-correlation signal 330 of FIG. 14 is a cross-correlation of expected-signal pattern 310 of FIG. 11 and derivative signal 120 of FIG. 14. Derivative signal 120 of FIG. 14 is an inverse of expected-signal pattern 310, where an inverse of expected-signal pattern 310 may be obtained by multiplying expected-signal pattern 310 by −1. Cross-correlation signal 330 of FIG. 14 has a single main peak with an amplitude of −4, and the remaining 12 sidelobes have amplitudes of +1 or −1. With a negative-threshold value set to −3, cross-correlation signal 330 of FIG. 14 may be referred to as having a single negative peak that is less than −3. A processor configured to analyze cross-correlation signal 330 of FIG. 14 may determine that it has a single negative peak that is less than the threshold value, and the remaining 12 sidelobes (with amplitudes of +1 or −1) may be discarded or removed from consideration since they are each greater than the threshold value of −3.

In particular embodiments, a predefined code sequence 300 or an expected-signal pattern 310 may be selected based on an autocorrelation of expected-signal pattern 310 having a particular peak-to-sidelobe ratio. A peak-to-sidelobe ratio may be defined as the magnitude (or, absolute value) of a main peak divided by the maximum magnitude of any sidelobes (or, secondary peaks). In FIG. 13, cross-correlation signal 330 has a main peak with a magnitude of 4 and 12 sidelobes each with a magnitude of 1, corresponding to a peak-to-sidelobe ratio of 4. For example, a predefined code sequence 300 may be selected based on an autocorrelation of its associated expected-signal pattern 310 having a peak-to-sidelobe ratio of 2, 3, 4, 5, 6, 8, 10, or any suitable value of peak-to-sidelobe ratio.

In particular embodiments, a predefined code sequence 300 or an expected-signal pattern 310 may be selected based on an autocorrelation of expected-signal pattern 310 having a particular difference between a main correlation peak and a secondary peak. In FIG. 13, cross-correlation signal 330 has a main peak with a magnitude of 4 and secondary peaks with magnitudes of 1, corresponding to a difference between the magnitudes of 3. For example, a predefined code sequence 300 may be selected based on an autocorrelation of its associated expected-signal pattern having a difference between a main correlation peak and a secondary peak of 2, 3, 4, 5, 6, 8, 10, or any suitable value.

FIG. 15 is a table of example code sequences 300. The example code sequences are presented in the middle column. The first column of the table gives the number of bits in each code sequence, and the third column gives a peak-to-sidelobe ratio of an autocorrelation of an expected-signal pattern associated with each code sequence. For example, the third entry is a code sequence with 7 bits, which may be represented as "+1 +1 +1 −1 +1 +1 −1" (or "1 1 1 0 1 1 0"), and a peak-to-sidelobe ratio of an autocorrelation of its associated expected-signal pattern of 4. The last two code sequences in FIG. 15 are presented in a compact form, where "ones(1,p)" represents a string of p ones and "−ones(1,q)" represents a string of q zeroes. Each of the code sequences in FIG. 15 has an autocorrelation of an associated expected-signal pattern (which is a derivative of the code sequence) with a single positive peak that is above a particular threshold value. In particular embodiments, code sequence 300 may have an autocorrelation of an associated expected-signal pattern 310 where the main peak of the autocorrelation has a magnitude equal to the number of transitions in the code sequence 300, and the other secondary peaks (which may be referred to as side peaks or side lobes) have maximum magnitudes of 1. In particular embodiments, communication between two devices may be based on one or more of the code sequences in FIG. 15. Although this disclosure describes and illustrates particular code sequences having particular numbers of bits and associated with particular peak-to-sidelobe ratios, this disclosure contemplates any suitable code sequences having any suitable numbers of bits and associated with any suitable peak-to-sidelobe ratios.

In particular embodiments, code sequences 300 may be associated with a single transmission frequency where each bit is equally spaced or has an equal duration. For example, each bit of the 4-bit code sequence 300 in FIG. 15 may have an equal duration of approximately 2 μs. In other particular embodiments, code sequences 300 may be associated with a spread-spectrum transmission technique where one or more of the bits of code sequence 300 have different durations or correspond to different transmission frequencies. For example, the 4-bit code sequence 300 in FIG. 15 may be transmitted with a spread-spectrum technique where each of the four bits, +1 +1 −1 +1, has a duration of 2 µs, 2.3 µs, 2.7 µs, and 3.4 µs, respectively.

In particular embodiments, each individual bit of code sequence 300 may have an equal duration, and the code sequence overall may act as a spread-spectrum code sequence. For example, each bit of the 40-bit and 100-bit code sequences 300 in FIG. 15 may have the same duration. Each of these code sequences includes subsets (e.g., ones (1,p) and −ones(1,q)) where the duration of each subset, as represented by the different values of p and q, is different. Since the duration of each subset is different, the 40-bit and 100-bit code sequences may be associated with a spread-spectrum transmission technique. For example, if the transmitting clock has a clock frequency of 12 MHz, then each bit may have a duration of about 83 ns. For the 100-bit code sequence, the duration of the first subset "ones(1,10)" is approximately 10×83 ns, or about 0.83 µs. The duration of each of the four subsets of the 100-bit code sequence is 0.83 µs, 1.25 µs, 2.25 µs, and 4 µs, which corresponds to a spread-spectrum code sequence 300 where each subset of the code sequence has a different duration.

Figure 16:
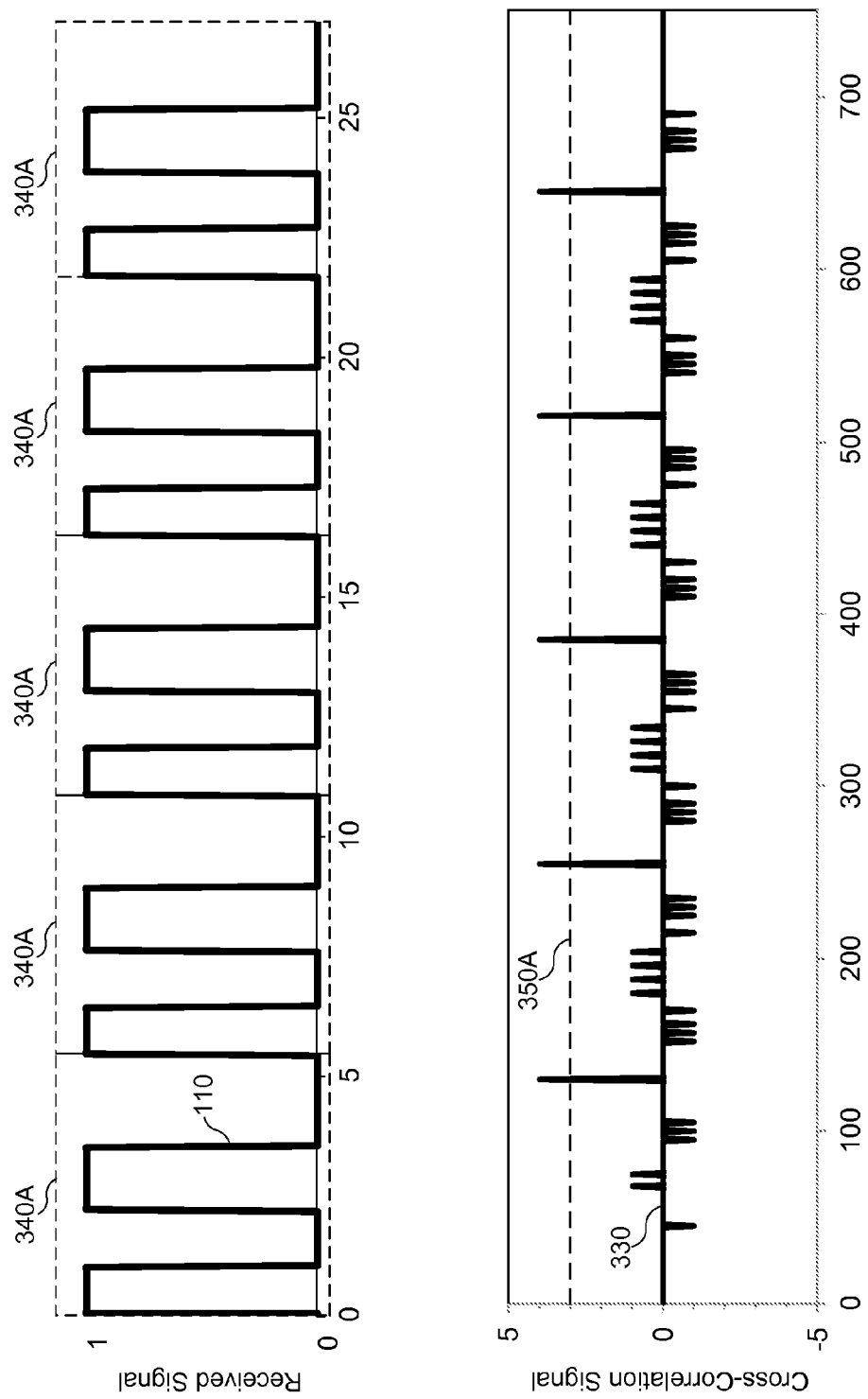
FIG. 16 illustrates an example received signal and an example cross-correlation signal.
Figure 17:
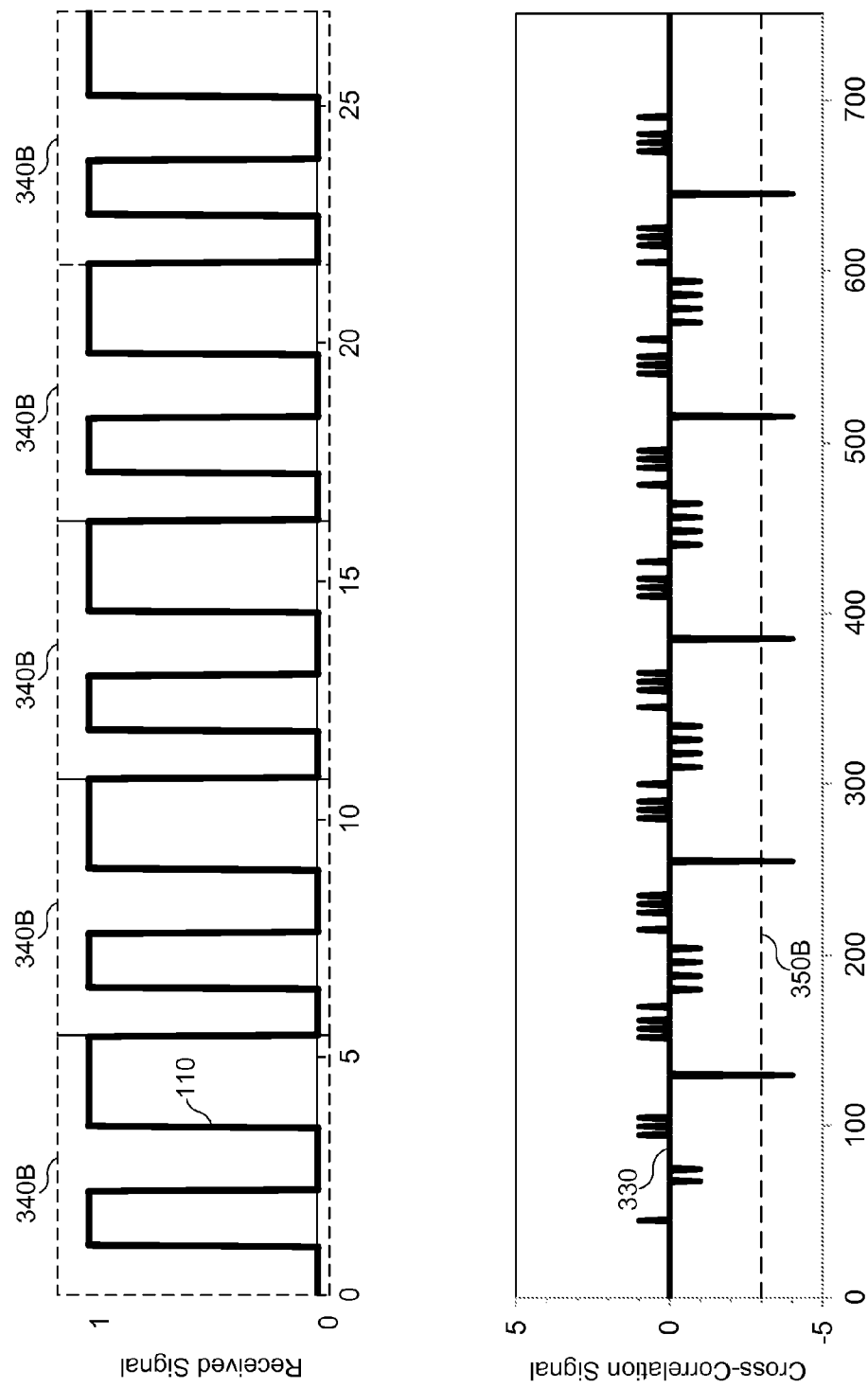
FIG. 17 illustrates an example received signal and an example cross-correlation signal.

FIGS. 16 and 17 each illustrate an example received signal 110 and an example cross-correlation signal 330. In particular embodiments, received signal 110 may include one or more repetitions of code sequence 300 or one or more repetitions of an inverse of code sequence 300. In FIG. 16, received signal 110 includes five repeated portions 340A, each portion 340A corresponding to code sequence 300 of FIG. 11. In FIG. 17, received signal 110 includes five repeated portions 340B, each portion 340B corresponding to the inverse of code sequence 300 of FIG. 11.

In FIGS. 16 and 17, cross-correlation signal 330 is produced by performing a cross-correlation of expected-signal pattern 310 of FIG. 11 with a derivative signal corresponding to a derivative of received signal 110. In particular embodiments, cross-correlation signal 330 may include one or more positive or negative cross-correlation pulses, each positive cross-correlation pulse indicating the presence of code sequence 300 in received signal 110, and each negative cross-correlation pulse indicating the presence of an inverse of code sequence 300 in received signal 110. For example, each positive cross-correlation pulse having an amplitude above a positive-threshold value 350A (e.g., positive threshold=+3) indicates that received signal 110 includes a corresponding occurrence of code sequence 300. Similarly, each negative cross-correlation pulse with an amplitude below a negative-threshold value 350B (e.g., negative threshold=−3) indicates that received signal 110 includes a corresponding occurrence of the inverse of code sequence 300. Each cross-correlation signal 330 in FIGS. 16 and 17 includes five main pulses with amplitude of +4 or −4, respectively, as well as multiple secondary pulses having amplitudes of +1 or −1. The five main pulses correspond to the five repeated portions 340A or 340B in received signal 110. Each cross-correlation pulse of amplitude +4 or −4 occurs at a point of the cross-correlation operation where the peaks of expected-signal pattern 310 coincide with peaks that correspond to the derivative of code sequence 300 or the derivative of the inverse of code sequence 300, respectively.

In particular embodiments, received signal 110 may include N repetitions of code sequence 300, where N is a positive integer. In FIG. 16, received signal 110 includes N=5 repetitions of code sequence 300 of FIG. 11, each repetition corresponding to a portion 340A. In particular embodiments, cross-correlation signal 330 may include N positive cross-correlation pulses, each pulse corresponding to an occurrence of portion 340A in received signal 110. In particular embodiments, each cross-correlation pulse may have an amplitude greater than a particular positive-threshold value 350A. In FIG. 16, cross-correlation signal 330 includes N=5 positive cross-correlation pulses, where each pulse has an amplitude of +4 (which is greater than the positive threshold of +3).

In particular embodiments, received signal 110 may include N repetitions of an inverse of code sequence 300, where N is a positive integer. In FIG. 17, received signal 110 includes N=5 repetitions of the inverse of code sequence 300 of FIG. 11, each repetition corresponding to a portion 340B. In particular embodiments, cross-correlation signal 330 may include N negative cross-correlation pulses, each pulse corresponding to an occurrence of portion 340B in received signal 110. In particular embodiments, each cross-correlation pulse may have an amplitude less than a particular negative-threshold value 350B. In FIG. 17, cross-correlation signal 330 includes N=5 negative cross-correlation pulses, where each pulse has an amplitude of −4 (which is below the positive threshold of −3).

In particular embodiments, transmitted signal 100 and received signal 110 having multiple repetitions of code sequence 300 or the inverse of code sequence 300 may be used to transmit data from a transmitting device to a receiving device. For example, a transmitted signal 100 (and a corresponding received signal 110) with N repetitions of code sequence 300 may represent a bit value of 1, and a transmitted signal 110 with N repetitions of the inverse of code sequence may represent a bit value of 0. Longer sequences of bits (which may correspond to commands or other information sent between two devices) may be produced by combining together multiple repetitions of code sequence 300 and the inverse of code sequence 300. In particular embodiments, encoding transmitted signal 100 as described herein may be referred to as a binary phase-shift keying (BPSK) modulation technique or as a podal/antipodal encoding scheme.

In particular embodiments, cross-correlation signal 330 having a sequence of N positive or negative cross-correlation pulses may correspond to a particular bit value. FIGS. 15 and 16 each illustrate sequences of N=5 cross-correlation pulses, which corresponds to each transmitted data bit being associated with five repetitions of code sequence 300 or an inverse of code sequence 300. Cross-correlation signal 330 having N=5 positive cross-correlation pulses above threshold 350A, as illustrated in FIG. 16, may correspond a bit value of 1. Similarly, in FIG. 17, cross-correlation signal 330 having N=5 negative cross-correlation pulses below threshold 350B may correspond to a bit value of 0. In particular embodiments, cross-correlation signal 330 may include a combination of one or more positive cross-correlation pulses and one or more negative cross-correlation pulses. For example, a cross-correlation signal with 5 positive cross-correlation pulses followed by 5 negative cross-correlation pulses may correspond to a transmitted bit sequence of "1 0." In the example of FIG. 12, each transmitted data bit is associated with a single repetition of code sequence 300 or a single repetition of an inverse of code sequence 300, which corresponds to a sequence of N=1 cross-correlation pulses per bit of data. In particular embodiments, received signal 110 may include 1, 2, 5, 10, 20, or any suitable number of repetitions of code sequence 300 or an inverse of code sequence 300 per bit of data, and cross-correlation signal 330 may include a corresponding number of pulses per bit of data.

In particular embodiments, a receiving device may perform a second correlation of cross-correlation signal 330. For example, the output of correlator circuit 240 illustrated in FIGS. 6 and 10 may be fed into a second correlator (e.g., a beat correlator). A second correlator may act as a pattern overlay correlation which looks for a specific pattern at the output of the first correlator. In particular embodiments, performing a second correlation may include applying a low-pass filter to cross-correlation signal 330. For example, a second correlator may include a finite impulse response (FIR) filter. In particular embodiments, a secondary correlation technique may be implemented based on an analysis of cross-correlation signal 330. For example, a processor may perform a statistical analysis of cross-correlation signal 330 to determine whether cross-correlation signal 330 includes a specific pattern or a valid series of pulses that corresponds to a data bit. In particular embodiments, a beat correlator may be applied where data is encoded using multiple repetitions (e.g., N≥2) of code sequence 300 or the inverse of code sequence 300. Applying a second correlation may be used to determine whether a cross-correlation signal includes a specific pattern or a series of N pulses. For example, a code sequence 300 with a relatively small number of bits (e.g., the codes from FIG. 15 having less than or equal to 10 bits) may be repeated multiple times per bit. This signal will produce multiple peaks in a cross-correlation signal, and a beat correlator may overlay these multiple peaks together to product a single larger peak having a greater peak-to-sidelobe ratio than any of the multiple peaks. A computing device may analyze the output of the beat correlator to determine whether a valid signal or a valid bit (e.g., a 0 or 1) has been received.

In particular embodiments, a receiving device may determine, based on cross-correlation signal 330, that received signal 110 is associated with code sequence 300. For example, a receiving device may have code sequence 300 or a derivative of code sequence 300 (which corresponds to expected-signal pattern 310) stored in a memory. The receiving device may perform a cross-correlation between derivative signal 120 and expected-signal pattern 310. If cross-correlation signal 330 exhibits one or more positive (or negative) peaks that are greater than (or less than) a threshold value, then receiving device may determine that received signal 110 is associated with code sequence 300. In particular embodiments, received signal 110 being associated with code sequence 300 may refer to received signal 110 including one or more repetitions of code sequence 300 or an inverse of code sequence 330.

In particular embodiments, a receiving device may determine a value of a data bit sent by a transmitting device based at least in part on an amplitude of one or more cross-correlation pulses. For example, a receiving device may compare cross-correlation signal 330 to a positive-threshold value 350A and a negative-threshold value 350B. If cross-correlation signal 330 includes a series of one or more pulses with amplitudes that exceed positive-threshold value 350A, then the receiving device may determine that the pulses correspond to a bit value of 1 sent by transmitting device. Similarly, if cross-correlation signal 330 includes a series of one or more pulses with amplitudes that are less than negative-threshold value 350B, then the receiving device may determine that the pulses correspond to a bit value of 0 sent by transmitting device.

Figure 18:
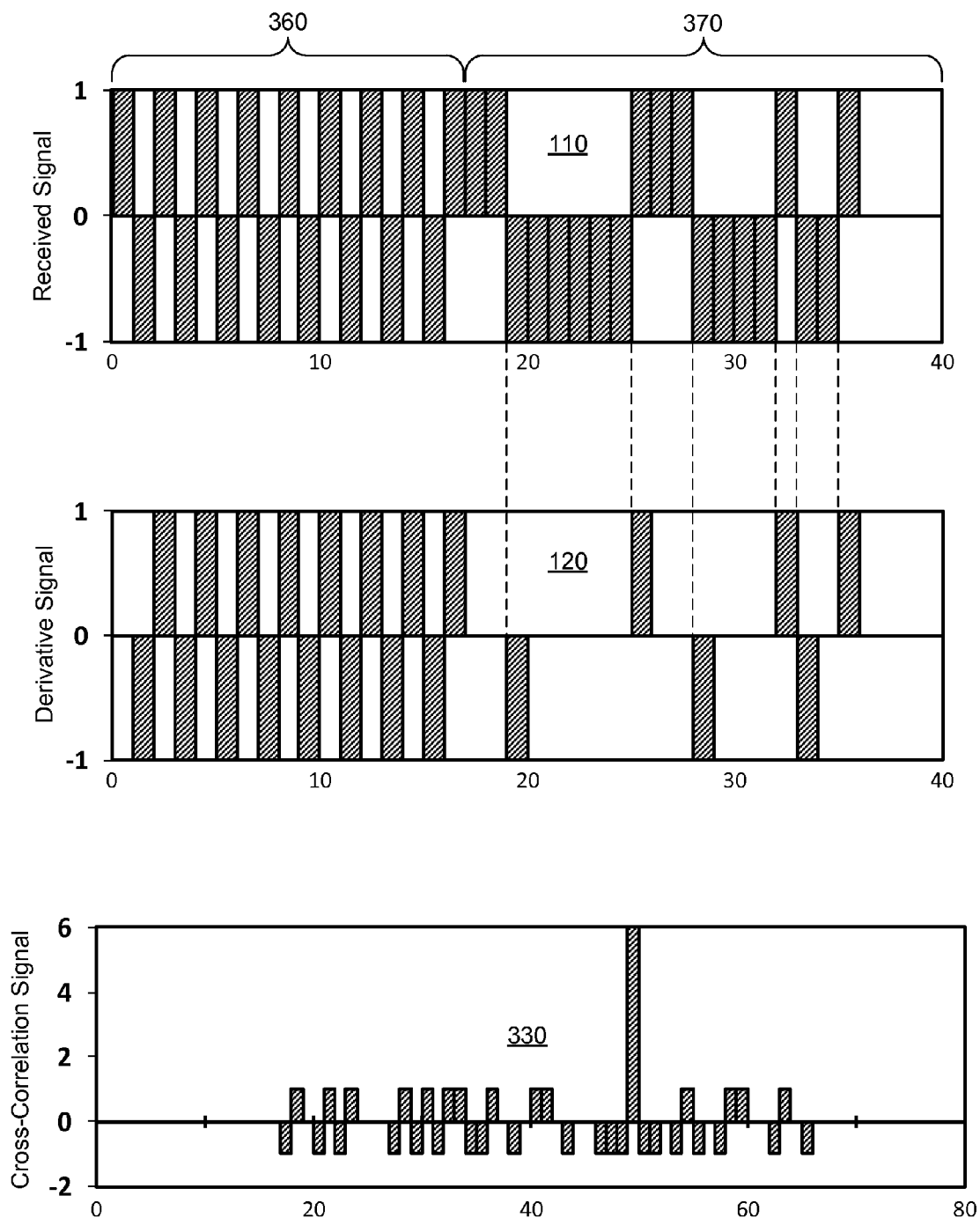
FIG. 18 illustrates an example received signal, derivative signal, and cross-correlation signal.

FIG. 18 illustrates example received signal 110, derivative signal 120, and cross-correlation signal 330. In particular embodiments transmitted signal 100 or received signal 110 may include a preamble portion 360 followed by a data portion 370. In FIG. 18, preamble portion 360 of received signal 110 includes a periodic square-wave signal, and data portion 370 includes code sequence 300 corresponding to the 19-bit code sequence of FIG. 15. In particular embodiments, a receiving device may process preamble portion 360 of received signal 110 to perform clock acquisition. For example, a receiving device may include a clock-recovery circuit to determine a frequency or timing of a clock of a transmitting device based on a square-wave pattern received as part of received signal 110.

In particular embodiments, data portion 370 may correspond to data transmitted from a transmitting device (e.g., device 52 or stylus 20) to a receiving device (e.g., device 52 or stylus 20). For example, the 19-bit code sequence may represent a bit value of 1, and the inverse of the 19-bit code sequence may represent a bit value of 0. Derivative signal 120 corresponds to a first derivative of received signal 110. The rising and falling edges of portion 370 are associated with the positive and negative pulses, respectively, of received signal 120, as indicated by the dashed lines in FIG. 18. Derivative signal 120 includes six pulses associated with edges in portion 370 of received signal 110. Cross-correlation signal 330 results from performing a cross-correlation of derivative signal 120 with expected-signal pattern 310, where expected-signal pattern 310 is based on a derivative of the 19-bit code sequence 300 of FIG. 15. Cross-correlation signal 330 has a single main peak with an amplitude of +6 as well as multiple side peaks with amplitudes of +1 or −1, which corresponds to a peak-to-sidelobe ratio of 6. A receiving device may apply a positive-threshold value of +4 to cross-correlation signal 330 and determine that cross-correlation signal 330 includes a single peak above the threshold value, corresponding to a bit value of 1.

In particular embodiments, a receiving device may determine, based at least in part on one or more cross-correlation pulses of cross-correlation signal 330, timing information of received signal 110 or clock information associated with a transmitting device. For example, timing information may be associated with the timing of data, such as for example a window of time or a start time corresponding to when a data bit is expected to be received. Additionally, clock information may refer to a frequency, phase, or timing of a clock associated with a transmitting device. Based on a location of a cross-correlation pulse in cross-correlation signal 330, a receiving device may determine timing information or clock information.

Figure 19:
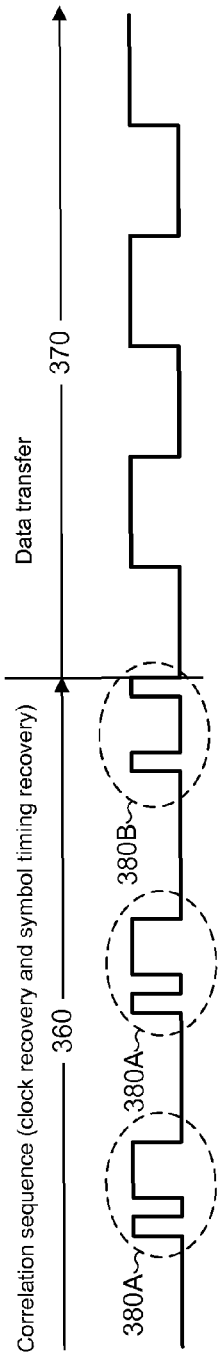
FIG. 19 illustrates an example signal with an example preamble portion and an example data portion.
Figure 20:
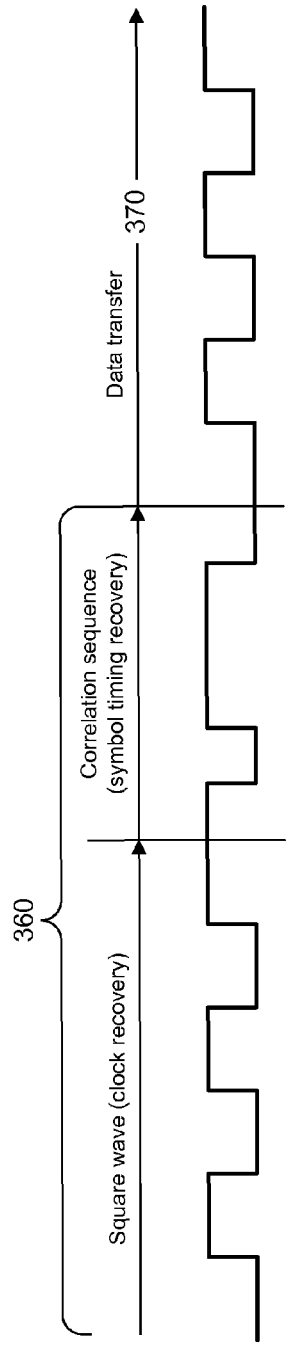
FIG. 20 illustrates an example signal with an example preamble portion and an example data portion.
Figure 21:
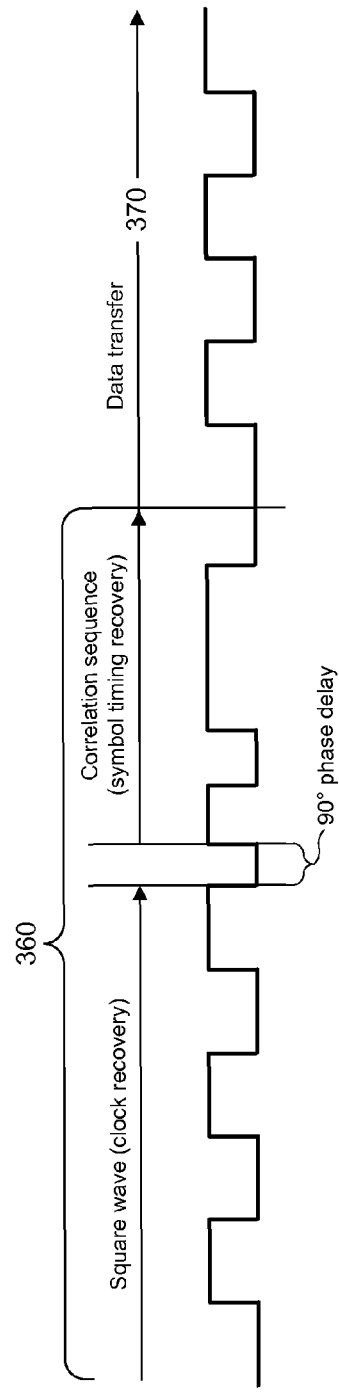
FIG. 21 illustrates an example signal with an example preamble portion and an example data portion.

FIGS. 19-21 each illustrate an example signal with an example preamble portion 360 and an example data portion 370. The signals illustrated in FIGS. 19-21 may correspond to transmitted signal 100 or received signal 110. In particular embodiments, transmitted signal 100 or received signal 110 may include one or more portions associated with clock recovery, symbol-timing recovery, or data transfer. In particular embodiments, clock recovery may refer to a process where a receiving device determines a frequency, phase, or timing of a clock associated with a transmitting device. For example, the frequency of a clock may be 10 MHz, 12 MHz, 24 MHz, or any suitable clock frequency, and the phase or timing of a clock may refer to a point in time or a phase where an edge of a clock occurs. In particular embodiments, symbol-timing recovery may refer to a process where a receiving device determines a timing associated with transmission of symbols (or, data) by a transmitting device. For example, a receiving device may determine a window of time in which a symbol or bit of data is expected to be received or may determine a start time when the receipt of a data bit is expected to begin. In particular embodiments, data transfer may refer to a process where a receiving device receives data (e.g., a stream of bits) sent by a transmitting device. For example, a receiving device may receive data from a transmitting device based on the symbol-timing information. In FIGS. 19-21, data-transfer portions 370 are illustrated as a square-wave signal. In particular embodiments, data-transfer portion 370 may include one or more repetitions of code sequence 300 or one or more repetitions of an inverse of code sequence 300, as described above.

FIG. 19 illustrates a signal with a preamble portion 360 for clock recovery and symbol-timing recovery and data portion 370 for data transfer (e.g., communication of data from a transmitting device to a receiving device). In FIG. 19, clock and symbol-timing recovery are performed in parallel based on synchronization patterns 380A and 380B. In particular embodiments, preamble portion 360 may include multiple repetitions of pattern 380A, and inverse pattern 380B (which is the inverse of pattern 380A) may indicate the end of the clock/symbol recovery phase and the start of data transfer. A receiving device may receive the inverse pattern 380B and determine that preamble portion 360 is completed and data-transfer portion 370 is starting.

FIG. 20 illustrates a signal where the preamble portion 360 includes a square-wave signal for clock recovery followed by a correlation sequence for symbol-timing recovery. In particular embodiments, the correlation sequence may include one or more synchronization patterns similar to pattern 380A in FIG. 19. The receiving device may perform a clock-recovery process based on the square-wave signal, and symbol-timing recovery may be performed with the correlation sequence.

FIG. 21 illustrates a signal similar to the signal of FIG. 20 with the addition of a 90° phase shift between the square-wave signal and the correlation sequence. Adding the 90° phase shift skews the edges of the data-transfer portion with respect to the edges of the square-wave signal. In particular embodiments, a 90° phase shift included between preamble portion 360 and data portion 370 may reduce the occurrence of false peaks in cross-correlation signal 330 due to edges of preamble portion 360. For example, a 90° phase shift (or any other suitable phase shift) may be introduced between preamble portion 360 and data portion 370 to reduce or substantially eliminate interference from preamble portion 360 in cross-correlation signal 330.

In particular embodiments, a signal sent from a transmitting device (e.g., device 52 or stylus 20) may be based on two or more predefined code sequences 300. For example, transmitted signal 100 or received signal 110 may include a first code sequence and a second code sequence (e.g., two code sequences from FIG. 15), where each occurrence of the first code sequence represents a bit value of 1, and each occurrence of the second code sequence represents a bit value of 0. In particular embodiments, a signal sent from a transmitting device may be based on two or more code sequences 300, where the expected-signal patterns associated with the code sequences are orthogonal to one another. In particular embodiments, two sequences or patterns may be referred to as being orthogonal if their associated cross-correlation has peaks below a particular magnitude. For example, two sequences, a and b, may be orthogonal if each peak of their cross-correlation, xcorr(a,b), has a magnitude less than 1, 2, 3, or any suitable maximum-peak value. For example, sequences a and b may be selected such that each sequence has an autocorrelation, represented by xcorr(a,a) and xcorr(b,b), respectively, with a peak-to-sidelobe ratio of 5, while their cross-correlation xcorr(a,b) has a peak magnitude of 1.

In particular embodiments, transmitted signal 100 or received signal 110 may include code sequences $c_1$ and $c_2$ with corresponding expected-signal patterns $y_1$ and $y_2$, respectively. A cross-correlation of pattern $y_1$ with itself, xcorr($y_1$,$y_1$), may have a single main peak above a particular threshold value along with several additional side peaks below the threshold value. Similarly, xcorr($y_2$,$y_2$), may have a single main peak with several additional side peaks. Additionally, expected-signal patterns $y_1$ and $y_2$ may be orthogonal such that all the peaks of xcorr($y_1$,$y_2$) are below a maximum-peak value (e.g., peak magnitude of xcorr($y_1$, $y_2$) is less than 1, 2, 3, or any suitable value).

In particular embodiments, code sequences may be selected such that a cross-correlation of a code sequence with all possible combinations of the code sequence produces a corresponding series of correlation peaks. For example, a cross-correlation of expected-signal pattern y with all possible combinations of the pattern may be expressed as xcorr([y, y, −y, y, −y, −y], y). This cross-correlation may produce a series of six peaks (e.g., + + − + − −, where + corresponds to a positive peak and − corresponds to a negative peak), each peak corresponding to a pattern in the series (y, y, −y, y, −y, −y). If the cross-correlation expression produces six peaks and has a peak-to-sidelobe ratio above a particular threshold value (e.g., 5), then the corresponding code sequence may be considered for use in a technique for sending or receiving information between two devices. If the cross-correlation expression produces six peaks plus one or more additional spurious peaks, then the peak-to-sidelobe ratio may not be above the particular threshold value, and the corresponding code sequence may be rejected or removed from consideration. In particular embodiments, selecting a code sequence based on such an analysis may reduce the occurrence of false correlation peaks associated with combining code sequences back-to-back.

Figure 22:
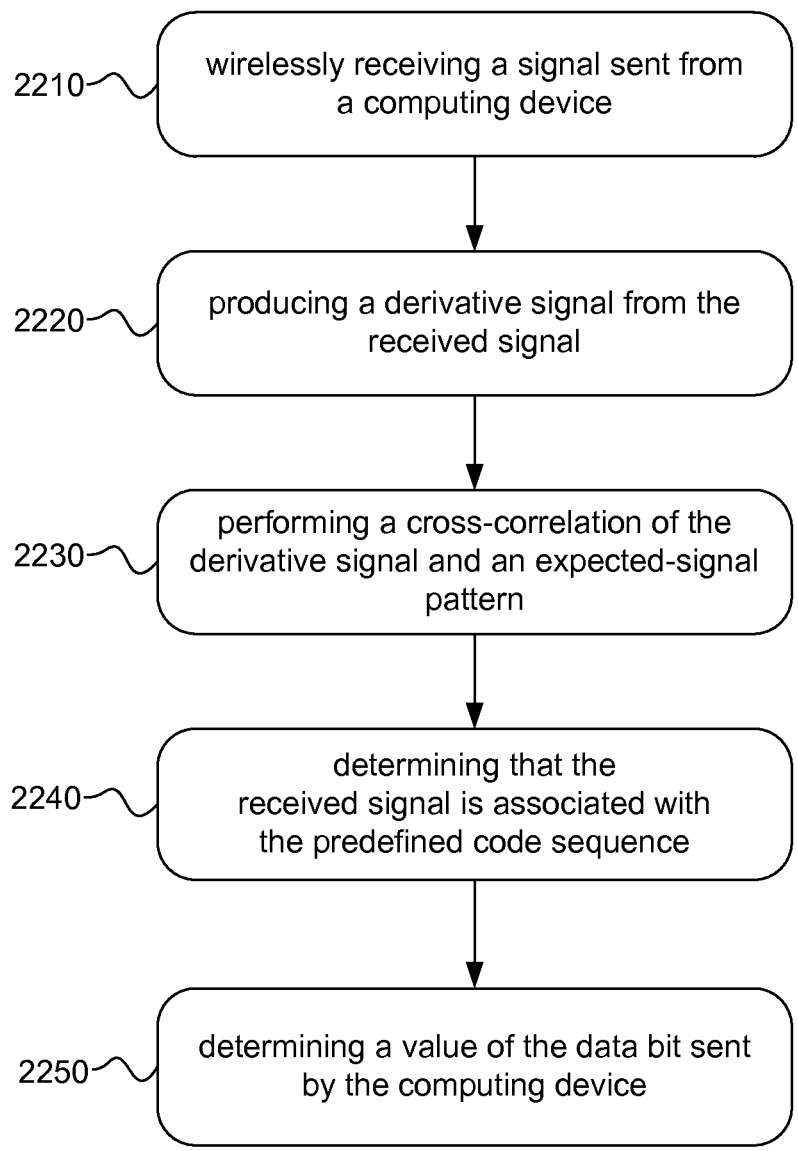
FIG. 22 illustrates an example method for receiving information.

FIG. 22 illustrates example method 2200 for receiving information. In particular embodiments, method 2200 illustrated in FIG. 22 may be performed by stylus 20 or a computing device (e.g., device 52) that includes touch sensor 10. The method may start at step 2210 where a signal sent from a computing device is wirelessly received. For example, transmitted signal 100 may be sent from touch sensor 10 of device 52 and wirelessly received, as received signal 110, by one or more electrodes of stylus 20. As another example, transmitted signal 100 may be sent from an electrode of stylus 20 and wirelessly received, as received signal 110, by one or more electrodes of touch sensor 10. In particular embodiments, received signal 110 may include a data bit and may be based on a predefined code sequence 300. For example, a computing device may send a sequence of data bits which represents a command or other information.

At step 2220, a derivative signal 120 may be produced from the received signal 110. For example, derivative signal 120 may be produced by one or more stylus electrodes or by one or more electrodes of touch sensor 10. In particular embodiments, derivative signal 120 may be derived from received signal 110 and may correspond to a derivative with respect to time of received signal 110. At step 2230, a cross-correlation of the derivative signal 120 and an expected-signal pattern 310 may be performed. For example, stylus 20 or device 52 may perform a cross-correlation of derivative signal 120 and expected-signal pattern 310. In particular embodiments, expected-signal pattern 310 may be based on a derivative with respect to time of predefined code sequence 300, and the cross-correlation may produce a cross-correlation signal 330 that includes one or more cross-correlation pulses.

At step 2240, it may be determined that received signal 110 is associated with predefined code sequence 300. For example, stylus 20 or device 52 may determine, based on cross-correlation signal 330, that received signal 110 is associated with predefined code sequence 300. At step 2250, a value of the data bit may be determined, at which point the method may end. For example, a value of one or more data bits sent by stylus 20 or device 52 may be determined by another stylus 20 or computing device. In particular embodiments, a value of a data bit may be determined based at least in part on an amplitude of the cross-correlation pulses.

Particular embodiments may repeat one or more steps of method 2200 of FIG. 22, where appropriate. Moreover, although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates an example method for receiving information, this disclosure contemplates any suitable method for receiving information, including any suitable steps, which may include all, some, or none of the steps of the method of FIG. 22, where appropriate. Furthermore, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Herein, reference to a computer-readable non-transitory storage medium or media may include one or more semiconductor-based or other integrated circuits (ICs) (such as, for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
wirelessly receiving, by an electrode of a stylus, a signal sent from a touch sensor of a computing device, the received signal comprising a data bit and being based on a predefined code sequence;
producing, by the electrode of the stylus, a derivative signal derived from the received signal, the derivative signal corresponding to a derivative with respect to time of the received signal;
performing, by the stylus, a cross-correlation of the derivative signal and an expected-signal pattern, the expected-signal pattern based on a derivative with respect to time of the predefined code sequence, wherein the cross-correlation produces a cross-correlation signal comprising one or more cross-correlation pulses;
determining, by the stylus, based on the cross-correlation signal, that the received signal is associated with the predefined code sequence; and
determining, by the stylus, a value of the data bit sent by the computing device based at least in part on an amplitude of the cross-correlation pulses;
wherein:
the received signal is a voltage or electric-field signal; and
the derivative signal comprises electric charge or electric current and is produced based at least on a capacitance associated with the electrode of the stylus.

2. The method of claim 1, further comprising converting, prior to performing the cross-correlation, the derivative signal into a digital signal such that performing the cross-correlation comprises performing a cross-correlation of the digital signal and the expected-signal pattern to produce the cross-correlation signal.

3. The method of claim 2, wherein:
the derivative signal comprises a series of electrical pulses, each pulse having a positive or negative polarity; and
converting the derivative signal into the digital signal comprises converting each positive-polarity pulse into a first value of the digital signal and converting each negative-polarity pulse into a second value of the digital signal.

4. The method of claim 1, wherein:
the received signal comprises a series of rising edges and falling edges;
the derivative signal comprises a series of electrical pulses, each pulse having a positive or negative polarity;
each positive-polarity pulse corresponds to a rising edge of the received signal; and each negative-polarity pulse corresponds to a falling edge of the received signal.

5. The method of claim 1, wherein an autocorrelation of the expected-signal pattern has a single positive peak that is greater than a particular positive-threshold value.

6. The method of claim 1, wherein the received signal comprises one or more repetitions of the predefined code sequence or one or more repetitions of an inverse of the predefined code sequence.

7. The method of claim 1, further comprising performing a beat correlation of the cross-correlation signal.

8. The method of claim 7, wherein performing the beat correlation comprises applying a low-pass filter to the cross-correlation signal.

9. The method of claim 1, wherein the predefined code sequence is a spread-spectrum code sequence.

10. The method of claim 1, wherein:
the received signal comprises N repetitions of the predefined code sequence, wherein N is a positive integer;
the cross-correlation signal comprises N positive cross-correlation pulses, the amplitude of each pulse being greater than a particular positive-threshold value; and
the value of the data bit sent by the computing device is 1.

11. The method of claim 1, wherein:
the received signal comprises N repetitions of an inverse of the predefined code sequence, wherein N is a positive integer;
the cross-correlation signal comprises N negative cross-correlation pulses, the amplitude of each pulse being less than a particular negative-threshold value; and
the value of the data bit sent by the computing device is 0.

12. The method of claim 1, wherein the one or more cross-correlation pulses comprise one or more positive or negative cross-correlation pulses, each positive cross-correlation pulse indicating a presence of the predefined code sequence in the received signal, and each negative cross-correlation pulse indicating a presence of an inverse of the predefined code sequence in the received signal.

13. The method of claim 1, wherein the signal sent from the touch sensor is further based on an additional predefined code sequence, wherein a derivative of the additional predefined code sequence is orthogonal to the expected-signal pattern.

14. The method of claim 1, further comprising determining, based at least in part on the cross-correlation pulses, timing information of the received signal or clock information associated with the computing device.

15. A system comprising:
an electrode configured to perform operations comprising:
wirelessly receiving a signal sent from a touch sensor of a computing device, the received signal comprising a data bit and being based on a predefined code sequence; and
producing a derivative signal derived from the received signal, the derivative signal corresponding to a derivative with respect to time of the received signal; and
a controller coupled to the electrode and embodying logic that is configured when executed to perform operations comprising:
performing a cross-correlation of the derivative signal and an expected-signal pattern, the expected-signal pattern based on a derivative with respect to time of the predefined code sequence, wherein the cross-correlation produces a cross-correlation signal comprising one or more cross-correlation pulses;
determining, based on the cross-correlation signal, that the received signal is associated with the predefined code sequence; and
determining a value of the data bit sent by the computing device based at least in part on an amplitude of the cross-correlation pulses;
wherein:
the received signal is a voltage or electric-field signal; and
the derivative signal comprises electric charge or electric current and is produced based at least on a capacitance associated with the electrode of the stylus.

16. The system of claim 15, wherein the logic is further configured when executed to convert, prior to performing the cross-correlation, the derivative signal into a digital signal such that performing the cross-correlation comprises performing a cross-correlation of the digital signal and the expected-signal pattern to produce the cross-correlation signal.

17. The system of claim 15, wherein:
the received signal comprises a series of rising edges and falling edges;
the derivative signal comprises a series of electrical pulses, each pulse having a positive or negative polarity;
each positive-polarity pulse corresponds to a rising edge of the received signal; and
each negative-polarity pulse corresponds to a falling edge of the received signal.

18. The system of claim 15, wherein an autocorrelation of the expected-signal pattern has a single positive peak that is greater than a particular positive-threshold value.

19. A non-transitory computer-readable storage medium embodying logic that is configured when executed by a processor to perform operations comprising:
performing a cross-correlation of a derivative signal and an expected-signal pattern to produce a cross-correlation signal comprising one or more cross-correlation pulses, wherein:
the derivative signal is produced from a received signal, the derivative signal corresponding to a derivative with respect to time of the received signal;
the received signal is wirelessly received from a touch sensor of a computing device, the received signal comprising a data bit and being based on a predefined code sequence; and
the expected-signal pattern is based on a derivative with respect to time of the predefined code sequence;
determining, based on the cross-correlation signal, that the received signal is associated with the predefined code sequence; and
determining a value of the data bit sent by the computing device based at least in part on an amplitude of the cross-correlation pulses;
wherein:
the received signal is a voltage or electric-field signal; and
the derivative signal comprises electric charge or electric current and is produced based at least on a capacitance associated with the electrode of the stylus.

20. The non-transitory computer-readable storage medium of claim 19, wherein:

the received signal comprises a series of rising edges and billing edges;
the derivative signal comprises a series of electrical pulses, each pulse having a positive or negative polarity;
each positive-polarity pulse corresponds to a rising edge of the received signal; and
each negative-polarity pulse corresponds to a failing edge of the received signal.

* * * * *